US007227137B2

(12) United States Patent
Londry et al.

(10) Patent No.: US 7,227,137 B2

(45) Date of Patent: Jun. 5, 2007

(54) FRAGMENTATION OF IONS BY RESONANT EXCITATION IN A HIGH ORDER MULTIPOLE FIELD, LOW PRESSURE ION TRAP

(75) Inventors: Frank Londry, Peterborough (CA); Bruce A. Collings, Bradford (CA); William R. Stott, King (CA)

(73) Assignee: MDS Inc., Concord, ON (CA)

( * ) Notice: Subject to any disclaimer, the term of this patent is extended or adjusted under 35 U.S.C. 154(b) by 45 days.

(21) Appl. No.: 10/508,950

(22) PCT Filed: Apr. 2, 2003

(86) PCT No.: PCT/CA03/00477

§ 371 (c)(1), (2), (4) Date: Apr. 12, 2005

(87) PCT Pub. No.: WO03/088305

PCT Pub. Date: Oct. 23, 2003

(65) Prior Publication Data

US 2005/0178963 A1 Aug. 18, 2005

Related U.S. Application Data

(63) Continuation of application No. 10/310,003, filed on Dec. 4, 2002, now Pat. No. 7,049,580.

(60) Provisional application No. 60/370,205, filed on Apr. 5, 2002.

(51) Int. Cl.

| | |
|---|---|
| ***H01J 49/42*** | (2006.01) |
| ***H01J 49/00*** | (2006.01) |
| ***B01D 59/44*** | (2006.01) |

(52) U.S. Cl. ...................... 250/292; 250/282; 250/281; 250/290; 250/293

(58) Field of Classification Search ..................... None
See application file for complete search history.

(56) References Cited

U.S. PATENT DOCUMENTS 4,861,988 A 8/1989 Henion et al.

(Continued)

FOREIGN PATENT DOCUMENTS

EP 567276 4/1993

OTHER PUBLICATIONS

Marshall et al., 1998. "Fourier Transform Ion Cyclotron Resonance Mass Spectrometry: A Primer". Mass Spectrometry Reviews 17:1-35.

Dawson, P.H., 1980. "Ion Optical Properties of Quadrupole Mass Filters". Advances in Electronics and Electron Physics 53:153-208.

International Search Report of PCT/CA2003/00477 (published as WO 03/088305).

*Primary Examiner*—Nikita Wells

(74) *Attorney, Agent, or Firm*—Torys LLP; Matthew Marquardt; John Hunt

(57) ABSTRACT

In the field of mass spectrometry, a method and apparatus for fragmenting ions with a relatively high degree of resolution and efficiency. The technique includes trapping the ions in a linear ion trap, in which the background or neutral gas pressure is preferably on the order of 10-5 Torr. The trapped ions are resonantly excited for a relatively extended period of time, e.g., exceeding 50 ms, at relatively low excitation levels, e.g., less than 1 Volt (0-pk). The technique allows selective dissociation of ions with a high discrimination. High fragmentation efficiency may be achieved by superimposing a higher order multipole field onto the quadrupolar RF field used to trap the ions. The multipole field, preferably an octopole field, dampens the radial oscillatory motion of resonantly excited ions at the periphery of the trap. This reduces the probability that ions will eject radially from the trap thus increasing the probability of collision induced dissociation.

10 Claims, 22 Drawing Sheets

U.S. PATENT DOCUMENTS

| | | | |
|---|---|---|---|
| 4,963,736 | A | 10/1990 | Douglas et al. |
| 5,248,875 | A | 9/1993 | Douglas et al. |
| 5,679,950 | A | 10/1997 | Baba et al. |
| 6,111,250 | A | 8/2000 | Thomson et al. |
| 6,121,607 | A | 9/2000 | Whitehouse et al. |
| RE36,906 | E | 10/2000 | Franzen et al. |
| 6,177,668 | B1 | 1/2001 | Hager |
| 6,483,109 | B1 | 11/2002 | Reinhold et al. |
| 6,504,148 | B1 | 1/2003 | Hager |
| 6,703,607 | B2 | 3/2004 | Stott et al. |
| 6,720,554 | B2 | 4/2004 | Hager |
| 2003/0189168 | A1 | 10/2003 | Londry et al. |
| 2003/0189171 | A1 * | 10/2003 | Londry et al. .............. 250/292 |
| 2004/0011956 | A1 | 1/2004 | Londry et al. |

* cited by examiner

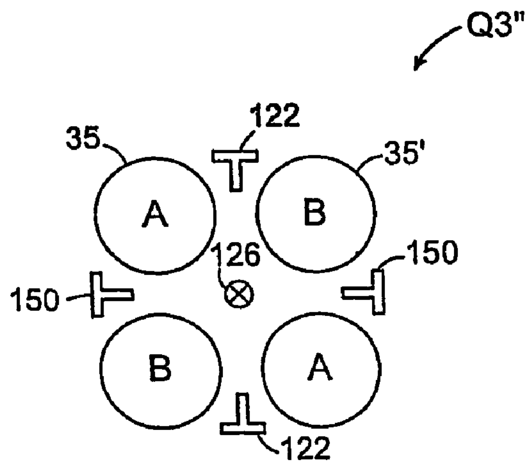
Figure 27
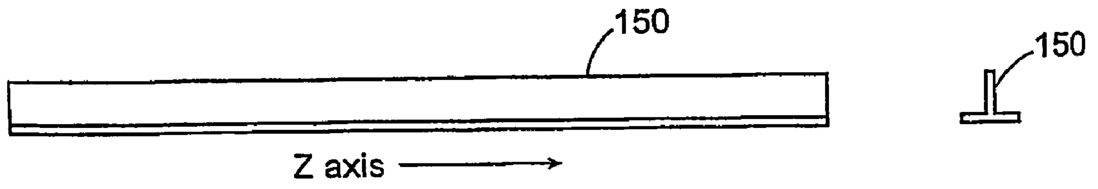
Figure 28A
Figure 28B
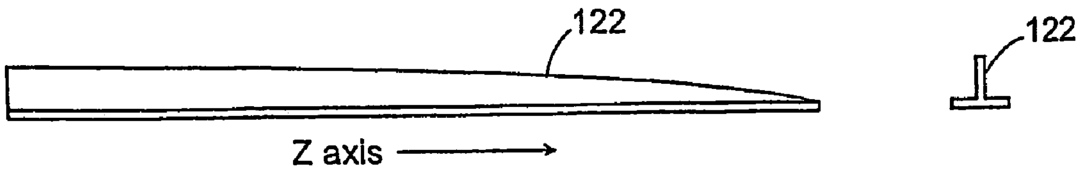
Figure 29A
Figure 29B

FRAGMENTATION OF IONS BY RESONANT EXCITATION IN A HIGH ORDER MULTIPOLE FIELD, LOW PRESSURE ION TRAP

RELATED APPLICATIONS

This application is a national entry application, filed under 35 USC § 371, of international patent application No. PCT/CA03/00477 filed Apr. 2, 2003 and published Oct. 23, 2003 under WO 03/088305, which application is a continuation of prior U.S. application Ser. No. 10/310,003 filed Dec. 4, 2002 now U.S. Pat. No. 7,049,580 and which claims priority from U.S. Provisional Patent Application Ser. No. 60/370,205 filed Apr. 5, 2002, all of which applications are incorporated herein by reference.

FIELD OF INVENTION

The invention relates to mass spectrometers, and more particulary to a mass spectrometer capable of fragmenting ions with relatively high efficiency and discrimination.

BACKGROUND OF INVENTION

Tandem mass spectrometry techniques typically involve the detection of ions that have undergone physical change(s) in a mass spectrometer. Frequently, the physical change involves dissociating or fragmenting a selected precursor or parent ion and recording the mass spectrum of the resultant fragment or child ions. The information in the fragment ion mass spectrum is often a useful aid in elucidating the structure of the precursor or parent ion. For example, the general approach used to obtain a mass spectrometry/mass spectrometry (MS/MS or $MS^2$) spectrum is to isolate a selected precursor or parent ion with a suitable m/z analyzer, subject the precursor or parent ion to energetic collisions with a neutral gas in order to induce dissociation, and finally to mass analyze the fragment or child ions in order to generate a mass spectrum.

An additional stage of MS can be applied to the MS/MS scheme outlined above, giving MS/MS/MS or $MS^3$. This additional stage can be quite useful to elucidate dissociation pathways, particularly if the $MS^2$ spectrum is very rich in fragment ion peaks or is dominated by primary fragment ions with little structural information. $MS^3$ offers the opportunity to break down the primary fragment ions and generate additional or secondary fragment ions that often yield the information of interest. Indeed, the technique can be carried out n times to provide an $MS^n$ spectrum.

Ions are typically fragmented or dissociated in some form of a collision cell where the ions are caused to collide with an inert gas. Dissociation is induced either because the ions are injected into the cell with a high axial energy or by application of an external excitation. See, for example, WIPO publication WO00/33350 dated Jun. 8, 2000 by Douglas et al.

Douglas discloses a triple quadrupole mass spectrometer wherein the middle quadrupole is configured as a relatively high pressure collision cell in which ions are trapped. This offers the opportunity to both isolate and fragment a chosen ion using resonant excitation techniques. The problem with the Douglas system is that the ability to isolate and fragment a specific ion within the collision cell is relatively low. To compensate for this, Douglas uses the first quadrupole as a mass filter to provide high resolution in the selection of precursor ions, which enables an $MS^2$ spectrum to be recorded with relatively high accuracy. However, to produce an $MS^3$ (or higher) spectrum, isolation and fragmentation must be carried out in the limited-resolution collision cell.

SUMMARY OF INVENTION

Generally speaking, the invention provides a method and apparatus for fragmenting ions in an ion trap with a relatively high degree of resolution. This is accomplished by maintaining an inert or background gas in the trap at a pressure lower than that of conventional collision cells. The pressure in the trap is thus on the order of $10^{-4}$ Torr or less, and preferably on the order of $10^{-5}$ Torr. The trapped ions are resonantly excited at a relatively low excitation amplitude for a relatively extended period of time, preferably exceeding 25 ms. Ions can thus be selectively dissociated or fragmented with a relatively high discrimination. For example, a discrimination of at least about 1 m/z was obtained at m/z=609.

According to one aspect of the invention a method is provided for analyzing a substance. The method includes (a) providing an ion trap having a background gas pressure of less than approximately $9\times10^{-5}$ Torr; (b) ionizing the substance to provide a stream of ions; (c) trapping at least a portion of the ion stream in the trap; (d) resonantly exciting selected trapped ions in order to promote collision-induced dissociation of the selected ions; and (e) thereafter mass analyzing the trapped ions to generate a mass spectrum. The resonant excitation is preferably accomplished by subjecting the ions to an alternating potential for an excitation period exceeding approximately 25 ms.

According to another aspect of the invention a method of fragmenting ions is provided. The method includes (a) trapping ions in an ion trap by subjecting the ions to an RF alternating potential, the trap being disposed in an environment in which a background gas is present at a pressure on the order of $10^{-5}$ Torr; and (b) resonantly exciting trapped ions of a selected m/z value by applying to at least one set of poles straddling the trapped ions an auxiliary alternating excitation signal for a period exceeding approximately 25 milliseconds, to thereby promote collision-induced dissociation of the selected ions.

According to another aspect of the invention a method of mass analyzing a stream of ions to obtain an $MS^2$ spectrum is provided. The method includes: (a) subjecting a stream of ions to a first mass filter step, to select precursor ions having a mass-to-charge ratio in a first desired range; (b) trapping the precursor ions in a linear ion trap by subjecting the ions to an RF alternating potential; (c) resonantly exciting the trapped precursor ions by subjecting them to an auxiliary alternating potential for an excitation period exceeding approximately 25 milliseconds under a background gas pressure on the order of $10^{-5}$ Torr, to thereby generate fragment ions; and (d) mass analyzing the trapped ions to generate a mass spectrum.

According to yet another aspect of the invention a method of mass analyzing a stream of ions to obtain an $MS^3$ spectrum is provided. The method includes: (a) subjecting a stream of ions to a first mass filter step, to select precursor ions having a mass-to-charge ratio in a first desired range; (b) fragmenting the precursor ions in a collision cell, to thereby produce a first generation of fragment ions; (c) trapping any un-dissociated precursor ions and the first generation of fragment ions in a linear ion trap by subjecting the ions to an RF alternating potential, subjecting the trapped ions to a second mass filter step to thereby isolate ions having an m/z value(s) in a second desired range, and resonantly exciting at least a portion of the first generation ions by subjecting them to an auxiliary alternating potential for an excitation period exceeding approximately 25 milliseconds under a background gas pressure on the order of $10^{-5}$ Torr, to thereby generate a second generation of fragment ions; and (d) mass analyzing the trapped ions to generate a mass spectrum.

According to still another aspect of the invention a mass spectrometer is provided. The mass spectrometer includes a linear ion trap for trapping ions spatially. At least one set of poles straddle at least a portion of the trapped ions. The poles may form part of the structure of the ion trap, or may be provided as extraneous poles. The background gas in the trap is at a pressure of less than approximately $9\times10^{-5}$ Torr. Means are provided for introducing ions into the trap. An alternating voltage source applies to the at least one of set of poles a resonant excitation signal for a period exceeding approximately 25 milliseconds, thereby to promote collision-induced dissociation of selected ions. Means are also provided for mass analyzing the trapped ions to generate a mass spectrum.

According to yet another aspect of the invention, a quadrupole mass spectrometer is provided which includes first, second and third quadrupole rod sets arranged in sequence. The first quadrupole rod set is configured for isolating selected ions. The second quadrupole rod set is enclosed within a collision chamber having a background gas pressure significantly higher than that present in the first and second rod sets. The third quadrupole rod set is configured as a linear ion trap, and includes at least one set of poles straddling at least a portion of trapped ions. The trap has a background gas pressure of less than approximately $9\times10^{-5}$ Torr. An alternating voltage source is provided for applying to at least one of the pole sets a resonant excitation signal for a period exceeding approximately 25 milliseconds, thereby to promote collision-induced dissociation of selected ions. The apparatus includes means for mass analyzing the trapped ions to generate a mass spectrum.

In the most preferred embodiments the resonant excitation signal is applied for a period exceeding approximately fifty (50) milliseconds (ms) up to about 2000 ms. The maximum amplitude of the resonant excitation signal or alternating potential is preferably limited to about 1 $V_{(0-pk)}$, although that value may vary depending on a variety of factors such as the degree of ion ejection that results, as explained in greater detail below.

According to another broad aspect of the invention, fragmentation efficiency may be increased by superimposing a higher order auxiliary field onto the field used to trap the ions. The auxiliary field, such as an octopole field in the case where ions are trapped using an RF quadrupolar field in a linear ion trap, dampens the oscillatory motion of resonantly excited ions approaching the radial periphery of the trap. This reduces the probability that ions will eject radially from the trap thus increasing the probability of collision induced dissociation, and hence the fragmentation efficiency.

According to one aspect of the invention, a method of fragmenting ions is provided, which includes: (a) trapping ions in an ion trap, the trap being disposed in or providing an environment in which a background gas is present at a pressure of less than approximately $9\times10^{-5}$ Torr; (b) resonantly exciting the selected trapped ions by subjecting them to an alternating potential to thereby promote collision-induced dissociation of at least a portion of the trapped ions; and (c) dampening the oscillatory motion of the resonantly excited selected ions at a periphery of the trap to thereby reduce the probability of the selected ions ejecting from the trap.

The dampening is preferably provided by introducing additional poles to provide higher order fields superimposed with the trapping field. In the preferred embodiment, the trap is a linear ion trap, the trapping field is an RF quadrupolar field, with the higher order field preferably providing only a relatively small amount of the total voltage experienced by ions near the central longitudinal axis of the trap.

According to another aspect of the invention, a linear ion trap is provided. The trap includes means for generating a substantially quadrupole RF trapping field; means for superimposing a higher order multipole field to the trapping field; means for providing a background gas in the trap at a pressure of less than approximately $9\times10^{-5}$ Torr; means for introducing ions into the trap; means for applying a resonant excitation signal in order to promote collision-induced dissociation of selected ions; and means for mass analyzing the trapped ions to generate a mass spectrum.

BRIEF DESCRIPTION OF DRAWINGS

The foregoing and other aspects of the invention will become more apparent from the following description of specific embodiments thereof and the accompanying drawings which illustrate, by way of example only and not intending to be limiting, the principles of the invention. In the drawings:

FIG. 27 is a radial cross-sectional view of a linear ion trap in a triple quadrupole mass spectrometer according to a fourth embodiment;

FIGS. 28A and 28B are elevation and end views, respectively, of an auxiliary electrode employed in the fourth embodiment;

FIGS. 29A and 29B are elevation and end views, respectively, of an auxiliary electrode employed in the fourth embodiment;

DETAILED DESCRIPTION OF ILLUSTRATIVE EMBODIMENTS

Figure 1:
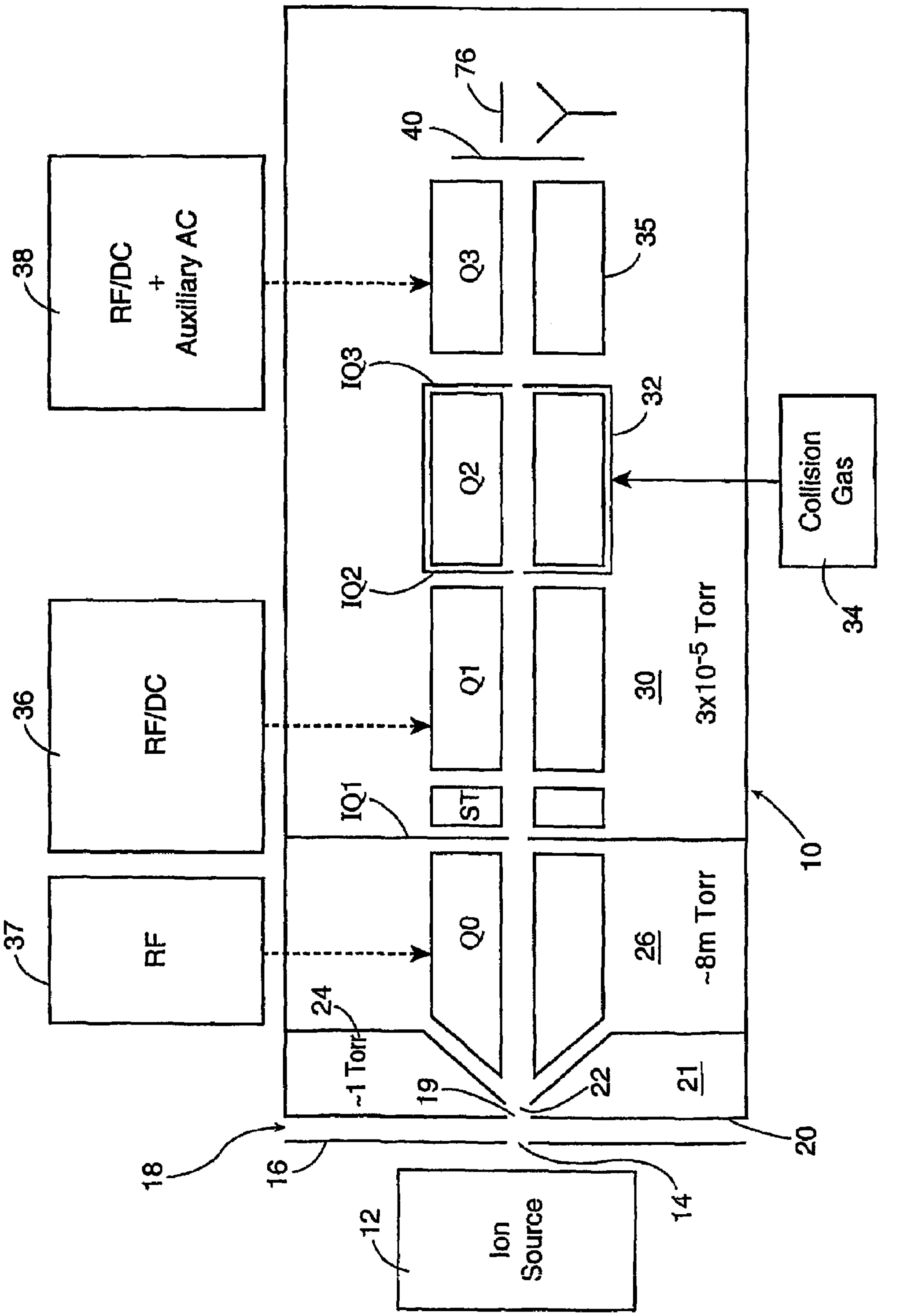
FIG. 1 is a system block diagram of a mass spectrometer in accordance with a first embodiment.

FIG. 1 illustrates a mass spectroscopy apparatus 10 in accordance with a first embodiment. In known manner, the apparatus 10 includes an ion source 12, which may be an electrospray, an ion spray, a corona discharge device or any other known ion source. Ions from the ion source 12 are directed through an aperture 14 in an aperture plate 16. On the other side of the plate 16, there is a curtain gas chamber 18, which is supplied with curtain gas from a source (not shown). The curtain gas can be argon, nitrogen or other inert gas, such as described in U.S. Pat. No. 4,861,988, to Cornell Research Foundation Inc., which also discloses a suitable ion spray device. The contents of this patent are incorporated herein by reference.

The ions then pass through an orifice 19 in an orifice plate 20 into a differentially pumped vacuum chamber 21. The ions then pass through aperture 22 in a skimmer plate 24 into a second differentially pumped chamber 26. Typically, the pressure in the differentially pumped chamber 21 is of the order of 1 or 2 Torr and the second differentially pumped chamber 26, often considered to be the first chamber of mass spectrometer, is evacuated to a pressure of about 7 or 8 mTorr.

In the chamber 26, there is a conventional RF-only multipole ion guide Q0. Its function is to cool and focus the ions, and it is assisted by the relatively high gas pressure present in chamber 26. This chamber 26 also serves to provide an interface between the atmospheric pressure ion source 12 and the lower pressure vacuum chambers, thereby serving to remove more of the gas from the ion stream, before further processing.

An interquad aperture IQ1 separates the chamber 26 from a second main vacuum chamber 30. In the second chamber 30, there are RF-only rods labeled ST (short for "stubbies", to indicate rods of short axial extent), which serve as a Brubaker lens. A quadrupole rod set Q1 is located in the vacuum chamber 30, which is evacuated to approximately 1 to $3\times10^{-5}$ Torr. A second quadrupole rod set Q2 is located in a collision cell 32, supplied with collision gas at 34. The collision cell 32 is designed to provide an axial field toward the exit end as taught by Thomson and Jolliffe in U.S. Pat. No. 6,111,250, the entire contents of which are incorporated herein by reference. The cell 32 is within the chamber 30 and includes interquad apertures IQ2, IQ3 at either end, and typically is maintained at a pressure in the range of about $5\times10^{-4}$ to $10^{-2}$ Torr, and more preferably to a pressure of about $5\times10^{-3}$ to $10^{-2}$ Torr. Following Q2 is located a third quadrupole rod set Q3, indicated at 35, and an exit lens 40. Opposite rods in Q3 are preferably spaced apart approximately 8.5 mm, although other spacings are contemplated and used in practice. The rods are preferably circular in cross-section and opposed to having perfect hyperbolic profiles. The pressure in the Q3 region is nominally the same as that for Q1, namely 1 to $3\times10^{-5}$ Torr. A detector 76 is provided for detecting ions exiting through the exit lens 40.

Power supplies for RF, 36, for RF/DC, and 38, for RF/DC and auxiliary AC are provided, connected to the quadrupoles Q0, Q1, Q2, and Q3. Q0 is operated as an RF-only multipole ion guide whose function is to cool and focus the ions as taught in U.S. Pat. No. 4,963,736, the contents of which are incorporated herein by reference. Q1 is a standard resolving RF/DC quadrupole. The RF and DC voltages are chosen to transmit only precursor ions of interest or a range of ions into Q2. Q2 is supplied with collision gas from source 34 to dissociate or fragment precursor ions to produce a 1st generation of fragment ions. Q3 is operated as a modified linear ion trap which, in addition to trapping ions, may also used to both isolate and fragment a chosen ion as described in far greater detail below. Ions are then scanned out of Q3 in a mass dependent manner using an axial ejection technique.

In the illustrated embodiment, ions from ion source 12 are directed into the vacuum chamber 30 where, if desired, a precursor ion m/z (or range of mass-to-charge ratios) may be selected by Q1 through manipulation of the RF+DC voltages applied to the quadrupole rod set as well known in the art. Following precursor ion selection, the ions are accelerated into Q2 by a suitable voltage drop between Q1 and Q2, thereby inducing fragmentation as taught by U.S. Pat. No. 5,248,875 the contents of which are hereby incorporated by reference. The degree of fragmentation can be controlled in part by the pressure in the collision cell, Q2, and the potential difference between Q1 and Q2. In the illustrated embodiment, a DC voltage drop of approximately 10–12 volts is present between Q1 and IQ2.

The 1st generation of fragment ions along with non-dissociated precursor ions are carried into Q3 as a result of their momentum and the ambient pressure gradient between Q2 and Q3. A blocking potential is present on the exit lens 40 to prevent the escape of ions. After a suitable fill time a blocking potential is applied to IQ3 in order to trap the precursor ions and 1st generation fragments in Q3, which functions as a linear ion trap.

Once trapped in Q3, the precursor ions and 1st generation of fragment ions may be mass isolated to select a specific m/z value or m/z range. Then, selected ions may be resonantly excited in the low pressure environment of Q3 as described in greater detail below to produce a 2nd generation of fragment ions (i.e., fragments of fragments) or selected precursor ions may be fragmented. Ions are then mass selectively scanned out of the linear ion trap, thereby yielding an $MS^3$ or $MS^2$ spectrum, depending on whether the 1st generation fragments or the precursor ions are dissociated in Q3. It will also be appreciated that the cycle of isolating and fragmenting can be carried out one or more times to thereby yield an $MS^n$ spectrum (where n>3).

As described in greater detail below, the selectivity or resolution of isolating and fragmenting ions in the low pressure environment of Q3 may be sufficiently high for many purposes. Accordingly, it will be understood that Q1, used for isolating precursor ions, can be omitted if desired, since this activity may be carried out in Q3, albeit not to the same degree of resolution. Similarly, the Q2 collision cell may be omitted since the step of fragmenting ions can occur entirely within the confines of the linear trap, Q3, with much higher resolution than within Q2. Indeed, the linear ion trap suitably coupled to an ion source may be used to generate an $MS^2$, $MS^3$ or higher spectrum.

Figure 2:
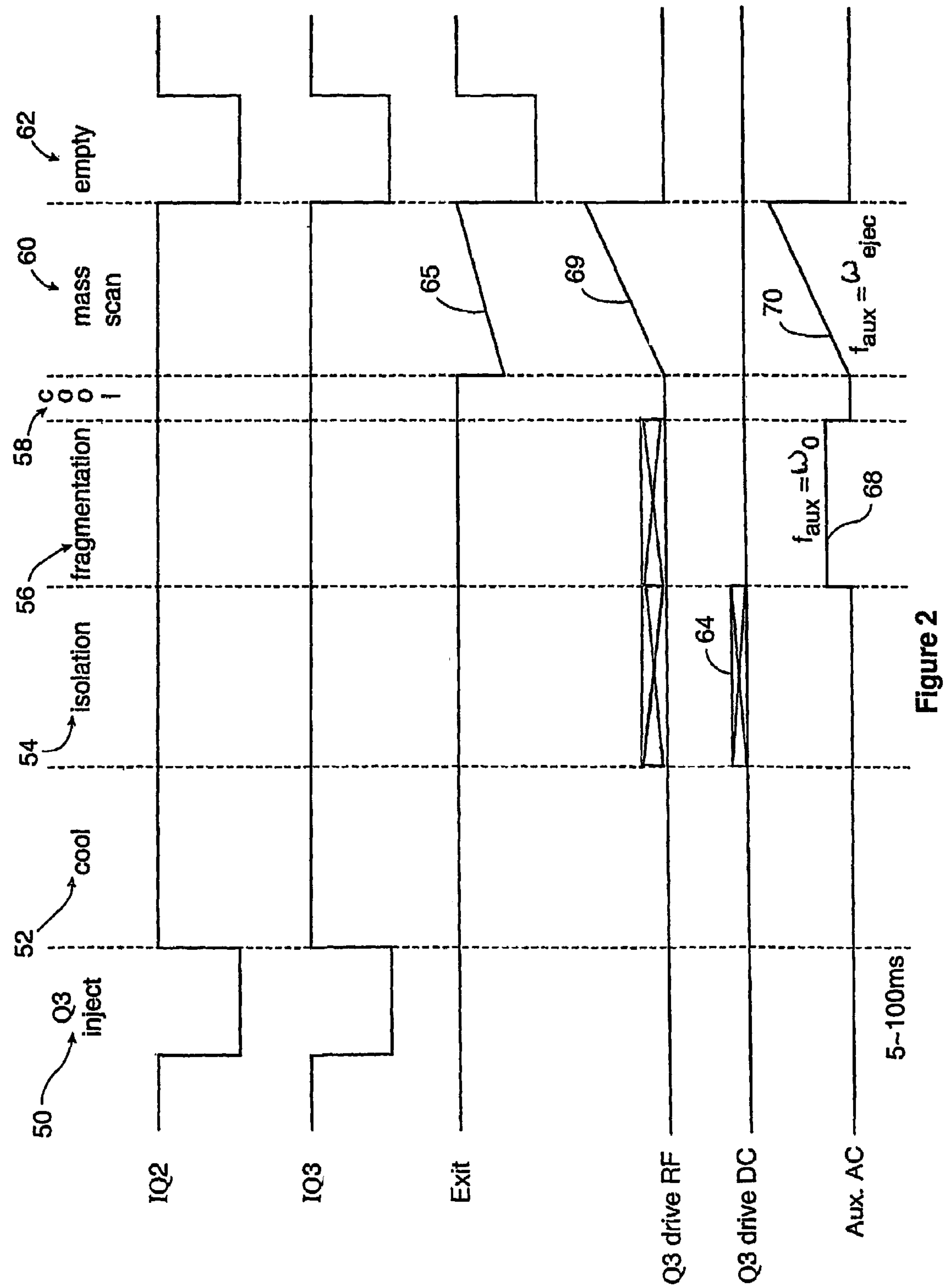
FIG. 2 is a timing diagram showing, in schematic form, electrical signals applied to a third quadrupole rod set of the first embodiment so as to inject, trap, isolate, fragment and eject selected ions.

FIG. 2 shows the timing diagrams of the waveforms applied in Q3 in greater detail. In an initial phase 50, the blocking potential on IQ3 is dropped so as to permit the trap to fill for a time preferably in the range of approximately 5–100 ms, with 50 ms being preferred.

Next, a cooling phase 52 follows in which the precursor and 1st generation ions are allowed to cool or thermalize for a period of about 10–150 ms in Q3. The cooling phase is optional, and may be omitted in practice.

This is followed by an ion isolation phase 54, if isolation is desired. Ion isolation in Q3 can be effected by a number of methods, such as the application of suitable RF and DC signals to the quadruple rods of Q3 in order to isolate a selected ion at the tip of a stability region or ions below a cut-off value. In this process, selected m/z ranges are made unstable because their associated a, q values fall outside the normal Mathieu stability diagram. This is the preferred method because the mass resolution of isolation using this technique is known to be relatively high. In the illustrated system, the frequency of the RF signal remains fixed, with the amplitudes of the RF signal and the DC offset being manipulated (as schematically illustrated by ref. no. 64) to effect radial ejection of unwanted ions. The auxiliary AC voltage component is not active during the isolation phase in the illustrated system. This phase lasts approximately <5 ms, and may be as short as 0.1 ms.

Alternatively, isolation can be accomplished through resonant ejection techniques which can be employed to radially eject all other ions such as disclosed, inter alia, in WIPO Publication No. WO 00/33350 dated Jun. 8, 2000 by Douglas et al., the contents of which are incorporated herein by reference. In the Douglas application, the auxiliary AC voltage is controlled to generate a notched broadband excitation waveform spanning a wide frequency range, created by successive sine waves, each with a relatively high amplitude separated by a frequency of 0.5 kHz. The notch in the broadband waveform is typically 2–10 kHz wide and centered on the secular frequency corresponding to the ion of interest. The isolation phase according to this technique lasts for approximately 4 ms.

Other ion isolation techniques are also contemplated since the particular means is not important, provided sufficient resolution is obtainable. It should be appreciated that isolation via resonant excitation techniques may be acceptable for many purposes because the resolution is relatively high as a result of the ions being trapped in a relatively low pressure environment. Consequently, as elaborated on in greater detail below, the spread or variation in secular frequencies of ions having identical m/z values is relatively low, thus enabling higher discrimination.

The isolation phase 54 is followed by a fragmentation phase 56 in which a selected ion is fragmented. During this phase 56 the auxiliary AC voltage, which is superimposed over the RF voltage used to trap ions in Q3, is preferably applied to one set of pole pairs, in the x or y direction. The auxiliary AC voltage (alternatively referred to as the "resonant excitation signal"), thus creates an auxiliary, dipolar, alternating electric field in Q3 (which is superimposed over the RF electric fields employed to trap ions). This subjects the trapped ions to an alternating potential whose maximum value is encountered immediately adjacent to the rods.

Application of the auxiliary AC voltage at the resonant frequency of a selected ion causes the amplitude of its oscillation to increase. If the amplitude is greater than the radius of the pole pair, the ion will be radially ejected from Q3 or neutralized by the rods. Alternatively, an energetic ion could collide with a background gas molecule with the energy being converted into sufficient internal energy required to cause the ion to dissociate and produce fragment ions. The inventors have discovered that through suitable manipulation of the excitation voltage and its period of application, it is possible to generate a sufficient number of ion/background gas collisions for CID to occur at a reasonably practical fragmentation efficiency even in the very low pressure environment of Q3, where the background gas pressure is preferably on the order of $10^{-5}$ Torr. This was previously thought to be to low of a pressure for this phenomenon to occur for practical use in mass spectroscopy. As an added benefit, the inventors have found that the resolution of fragmentation can be relatively high, about 700 as determined from experimental data discussed below, which is 2–3 times that previously reported in the literature.

It is also preferred to use rod sets in Q3 which are not perfectly hyperbolic in cross-section. For example, the preferred embodiment employs rods which are circular in cross-section. The application of the resonant excitation signal causes ions to oscillate in the radial direction, whereby the ions travel further and further away from the central longitudinal axis of the trap. In a non-hyperbolic rod set, the resonant excitation signal affects ions less the further they are away from the central longitudinal axis due to the non-ideal quadrupolar fields provided by such rods. In effect, the non-ideality of the quadrupolar field acts a damper on the oscillatory movement, causing less ions to eject radially in a given time frame and hence affording ions a greater opportunity to dissociate by collision with the background gas molecules.

In the illustrated embodiment, the resonant excitation signal is a sinusoid having an amplitude that ranges up to approximately 1 Volt measured zero to peak (0–pk) and preferably in the range of approximately 10 $mV_{(0\text{-}pk)}$ to approximately 550 $mV_{(0\text{-}pk)}$, the latter value being found to be generally sufficient for disassociating most of the more tightly coupled bonds found in biomolecules. In practice, a preset amplitude of approximately 24–25 $mV_{(0\text{-}pk)}$ has been found to work well over a wide range of m/z values.

The frequency of the resonant excitation signal $f_{aux}$ (68) is preferably set to equal the fundamental resonant frequency, $\omega_0$, of the ion selected for fragmentation. $\omega_0$ is unique for each m/z and approximated to a close degree by:

$$\omega_0 = \frac{q_u}{\sqrt{8}}\Omega$$

where Ω is the angular frequency of the trapping RF signal. This approximation is valid for $q_{x,y} \leqq 0.4$ in an RF-only quadrupole. In the illustrated embodiment Q3 is operated at a q of approximately 0.21 in the x and y planes.

The resonant excitation signal is applied for a period exceeding about 25 milliseconds (ms), and preferably at least approximately 50 ms ranging up to 2000 ms. In practice, an application period of 50 ms has been found to work well over a wide range of m/z values.

Fragmentation efficiency (defined as the sum of all fragment ions divided by the number of initial parent ions) can reach as high as about 70–95% under the preferred operating parameters for certain ions, as shown by experimental results discussed below.

Following fragmentation, the ions are preferably subjected to an additional cooling phase 58 of approximately 10 to 150 ms to allow the ions to thermalize. This phase may be omitted if desired.

A mass scan or mass analysis phase 60 follows the cooling phase. Here, ions are axially scanned out of Q3 in a mass dependent manner preferably using an axial ejection technique as generally taught in U.S. Pat. No. 6,177,668, the contents of which are incorporated herein by reference. Briefly, the technique disclosed in U.S. Pat. No. 6,177,668 relies upon injecting ions into the entrance of a rod set, for example a quadrupole rod set, and trapping the ions at the far end by producing a barrier field at an exit member. An RF field is applied to the rods, at least adjacent to the barrier member, and the RF fields interact in an extraction region adjacent to the exit end of the rod set and the barrier member, to produce a fringing field. Ions in the extraction region are energized to eject, mass selectively, at least some ions of a selected mass-to-charge ratio axially from the rod set and past the barrier field. The ejected ions can then be detected. Various techniques are taught for ejecting the ions axially, namely scanning an auxiliary AC field applied to the end lens or barrier, scanning the RF voltage applied to the rod set while applying a fixed frequency auxiliary voltage to the end barrier and applying a supplementary AC voltage to the rod set in addition to that on the lens and the RF on the rods.

The illustrated embodiment employs a combination of the above techniques. More particularly, the DC blocking potential 65 applied to the exit lens 40 is lowered somewhat, albeit not removed entirely, and caused to ramp over the scanning period. Simultaneously, both the Q3 RF voltage 69 and the Q3 auxiliary AC voltage 70 are ramped. In this phase, the frequency of the auxiliary AC voltage is preferably set to a predetermined frequency $\omega_{ejec}$ known to effectuate axial ejection. (Every linear ion trap may have a somewhat different frequency for optimal axial ejection based on its exact geometrical configuration.) The simultaneous ramping of the exit barrier, RF and auxiliary AC voltages increases the efficiency of axially ejecting ions, as described in greater detail in assignee's co-pending patent application Ser. No. 10/159,766 filed May 30, 2002, entitled "Improved Axial Ejection Resolution in Multipole Mass Spectrometers", the contents of which are incorporated herein by reference.

Figure 3:
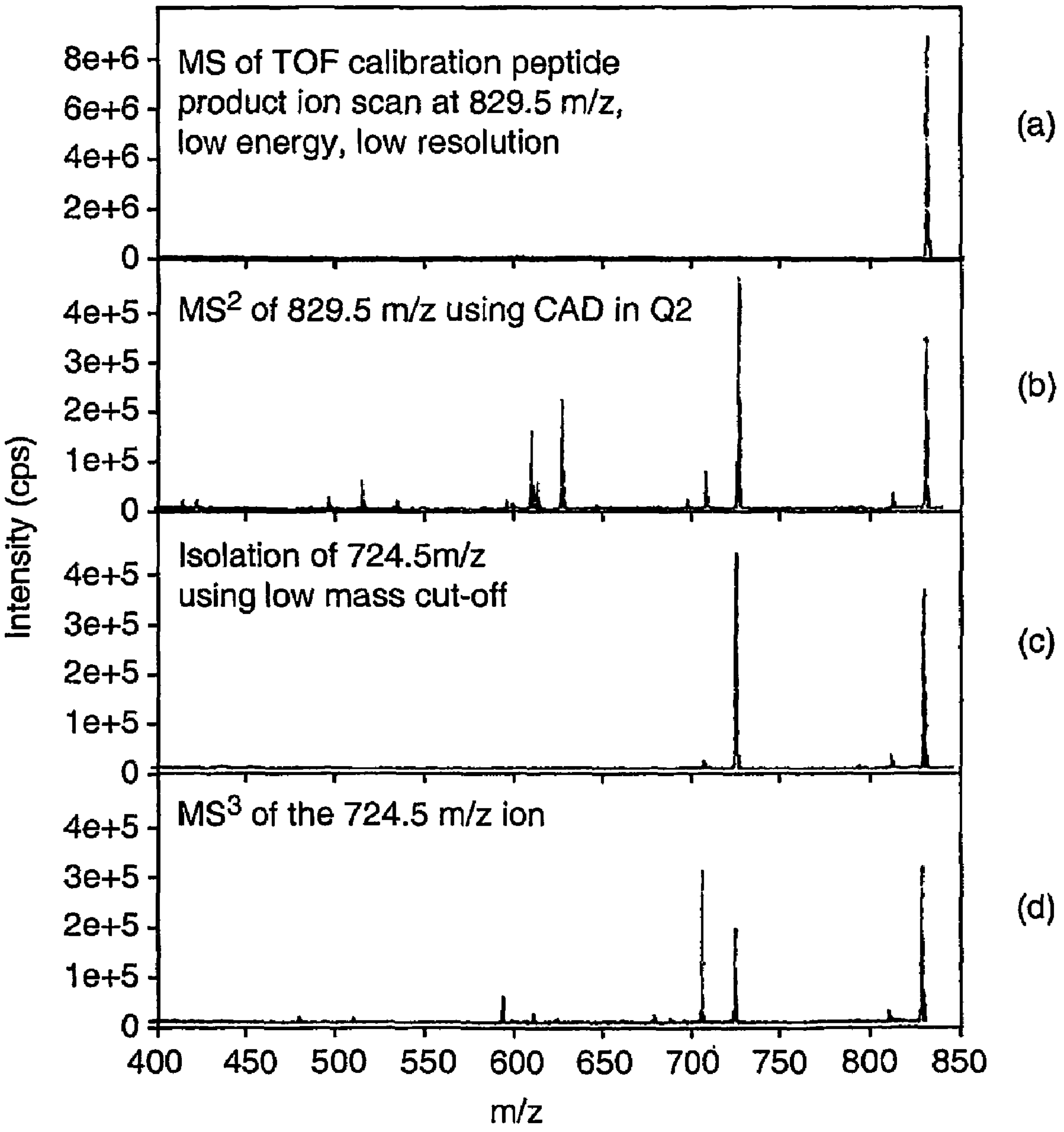
FIG. 3 shows a series of MS, $MS^2$ and $MS^3$ spectrums obtained from a calibration peptide using a first test instrument constructed according to the first embodiment.

Some experimental data using the aforementioned apparatus is now discussed with reference to FIGS. 3–8. FIG. 3 shows a number of mass spectrums, labeled (a)–(d), each of which relates to a standardized calibration peptide (5 μl/min, infusion mode). FIG. 3(*a*) is a high resolution MS spectrum wherein the peptide at m/z 829.5 was isolated using resolving RF/DC in Q1 (set at low resolution) and the ion was injected into the Q2 collision cell at low energy to minimize fragmentation. The neutral gas (nitrogen) pressure in the collision cell, Q2, was about 5–10 mTorr. The spectrum (and all other spectrums in FIG. 3) was obtained using the preferred axial ejection scanning technique in Q3 as described above. FIG. 3(*b*) shows the $MS^2$ spectrum of the peptide as it was driven with relatively high injection energy into the Q2 collision cell. FIG. 3(*c*) shows the isolation of high mass ions using a low mass cut-off technique in Q3 to remove most ions below a peak of interest at m/z 724.5. FIG. 3(*d*) is an $MS^3$ spectrum showing resonant excitation of ions at m/z=724.5. To produce this spectrum the resonant excitation signal was set to a frequency of 60.37 kHz and an excitation amplitude of 24 $mV_{(0\text{-}pk)}$. The excitation period was 100 ms. The neutral gas pressure in Q3 was $2.7\times10^{-5}$ Torr as measured at the chamber wall. (The Q3 quadrupole was not enclosed in a cell so this pressure is probably accurate to within a factor of 2–3 for the ambient pressure within Q3.) Note the increase in intensity of the peak at m/z=706 and the decrease in intensity of the m/z=724.5 peak in the $MS^3$ spectrum of FIG. 3(*d*) as compared to the $MS^2$ spectrum shown in FIG. 3(*b*).

Figure 4:
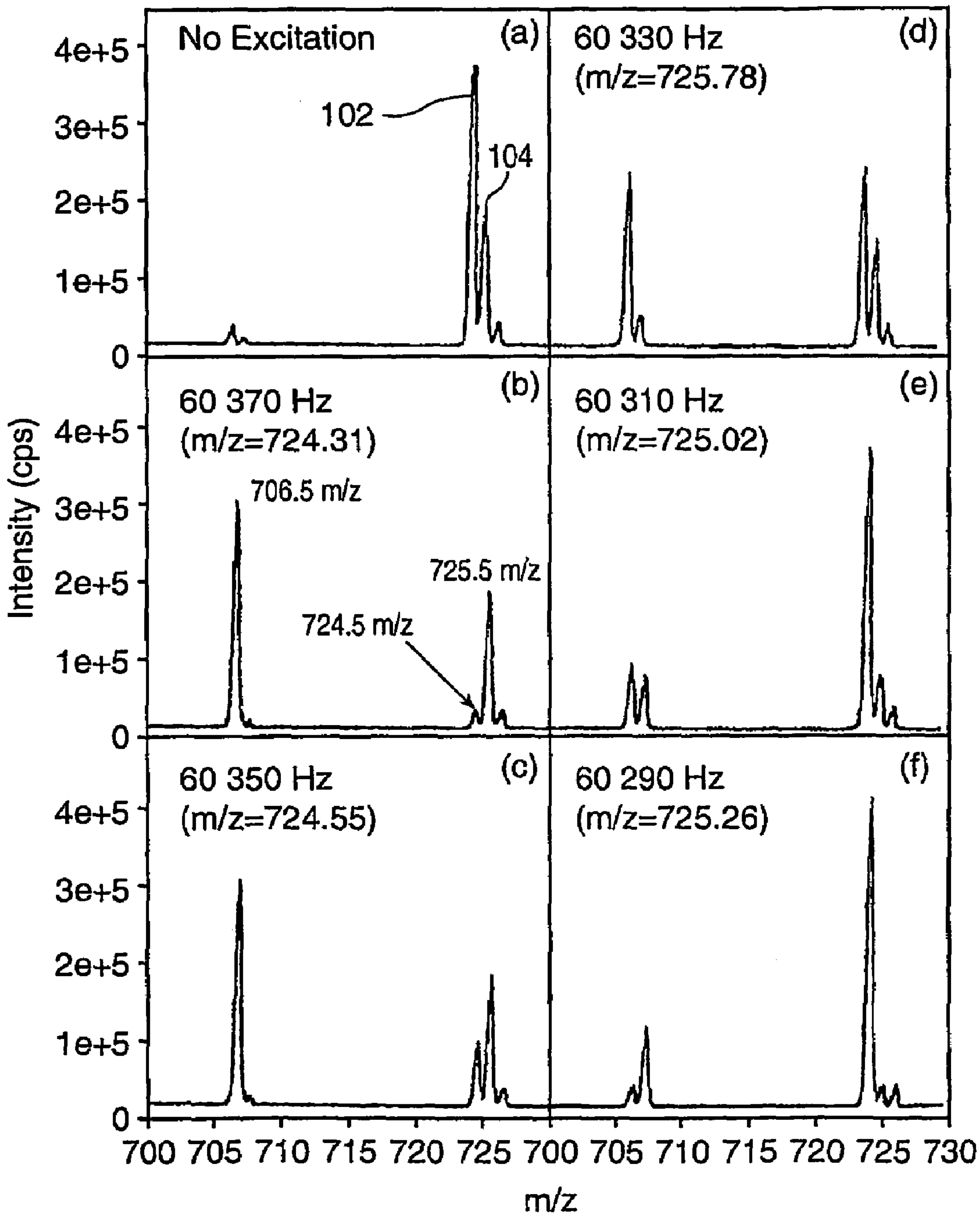
FIG. 4 shows a series of mass spectrums illustrating the isotopic pattern of peptide fragments vs. resonant excitation frequency, using the first test instrument.

FIG. 4 shows high resolution spectrums labeled (a)–(f) of 1st and 2nd generation fragments of the peptide as the excitation frequency is varied. FIG. 4(*a*) shows an $MS^2$ spectrum of 1st generation ions, i.e., wherein the ions are not resonantly excited. Note that the fragmentation resulting from the Q2 collision cell reveals two closely spaced fragment isotopes 102 and 104 at m/z=724.5 and at m/z=725.5. FIG. 4(*b*) shows the spectrum when the ions are resonantly excited at a frequency of 60.370 kHz (24 $mV_{(0\text{-}pk)}$, excitation period 100 ms). The m/z=724.5 ion has almost completely dissociated and the m/z peak at 706.5 is at its maximum intensity. As the frequency of excitation is decreased, the dissociation of the m/z ion at 724.5 decreases, as shown in FIGS. 4(*c*), 4(*d*) and 4(*e*). When the excitation frequency reaches 60.310 kHz, the isotope 104 at m/z=725.5 begins to demonstrate visible signs of dissociation, and is substantially dissociated when the excitation frequency reaches 60.290 kHz, as shown in the spectrum of FIG. 4(*f*). The system thus allows the user to selectively fragment ions 1 m/z units apart, i.e., the apparatus exhibits a discrimination of at least 1 m/z unit, at m/z=725. Given such selectivity, it will be appreciated that a non-fragmented isotope can be used to calibrate the spectrometer. In particular, the m/z value of the non-fragmented isotope can be compared to the m/z value prior to the fragmentation step. Any change in the m/z value can be used to identify and correct for mass drift of the instrument. Comparing the intensities of the non-fragmented isotope can also be used to correct for intensity variation.

Figure 5:
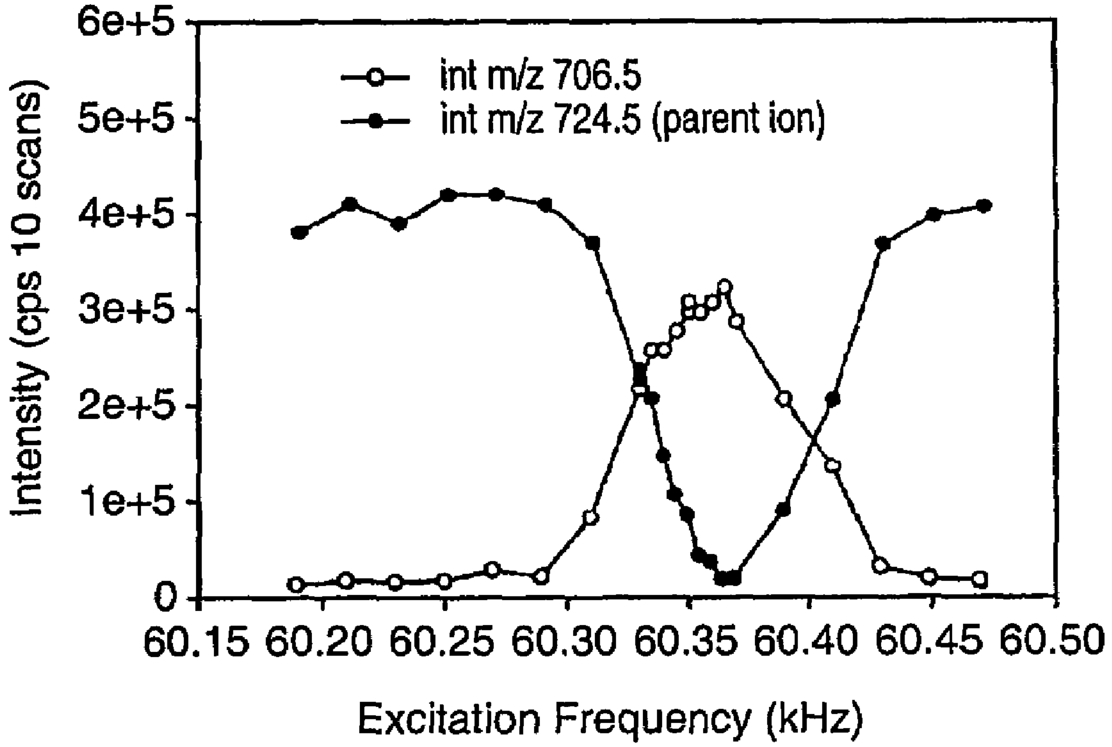
FIG. 5 is a graph which plots parent and fragment ion intensity for the peptide as a function of resonant excitation frequency, using the first test instrument.

FIG. 5 shows the intensity of a parent ion (the peptide fragment at m/z 724.5) and its fragment ion (the $2^{nd}$ generation peptide fragment at m/z 706.5) as a function of the excitation frequency (24 $mV_{(0\text{-}pk)}$, 100 ms excitation). The full width half maximum value (FWHM) of the parent ion intensity is 77 Hz. This gives a resolution of 784 (60360 Hz/77 Hz). The FWHM of the fragment is 87 Hz giving a resolution of 694. The fragmentation efficiency for the 724.5 to 706.5 dissociation is thus 73%. The overall fragmentation efficiency will be even higher when one considers that not all the fragment ions are m/z=706.5, as can be seen from the spectrum of FIG. 3(*d*).

Figure 6:
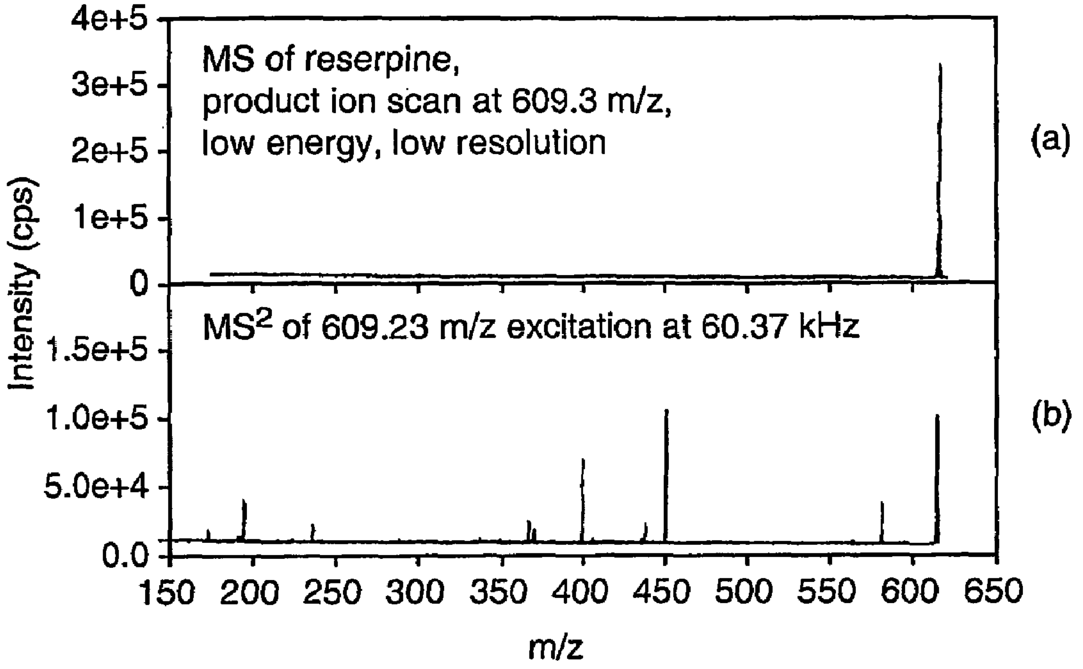
FIG. 6 shows a series of MS and $MS^2$ spectrums obtained from reserpine ions using the first test instrument.
Figure 7:
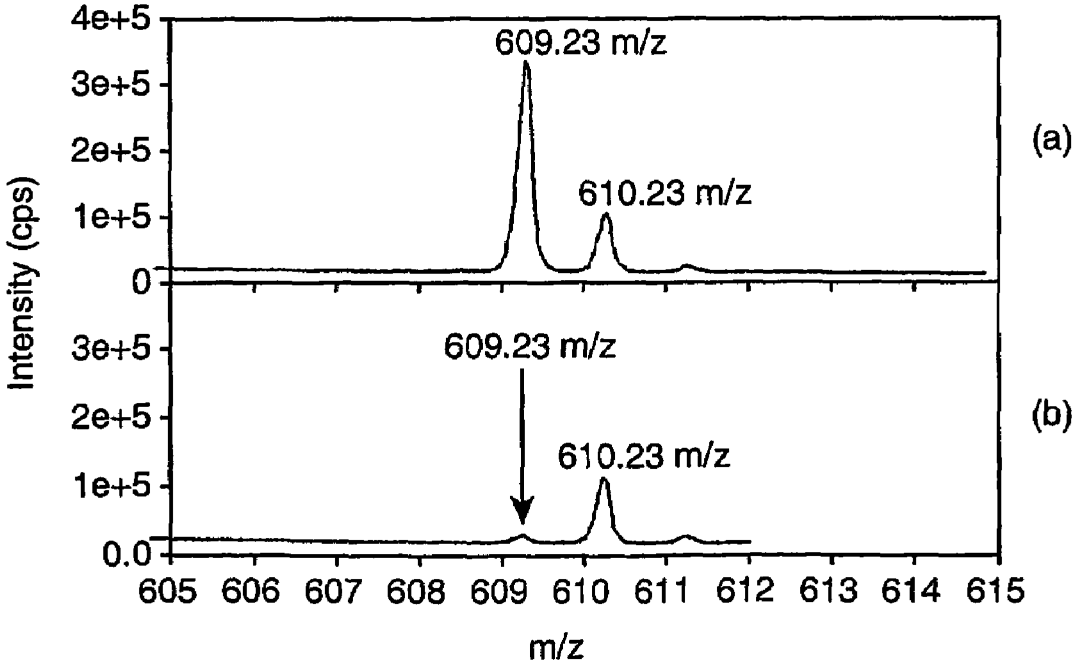
FIG. 7 is a detail view of certain portions of the plots shown in FIG. 6.

FIG. 6 shows mass spectrums, labeled (a) and (b), of reserpine (100 pg/□l, 5–10 □l/min, infusion mode). FIG. 6(*a*) is a high resolution mass spectrum of reserpine isolated in Q1 (set at low resolution) and injected at low energy into the collision cell Q2 and then into Q3 where the ions were trapped. No excitation was applied for 100 ms. The ions were then scanned out using the aforementioned preferred axial ejection technique. FIG. 6(*b*) shows an $MS^2$ spectrum after the reserpine ions were resonantly excited using a 60.37 kHz, 21 $mV_{(0\text{-}pk)}$ resonant excitation signal over a 100 ms excitation period. The integrated intensity of the m/z 609.23 peak in FIG. 6(*a*) is 1.75e6 cps while the integrated intensity of the fragment ions in FIG. 6(*b*) is 1.63e6 cps. This gives a fragmentation efficiency of 93%. FIG. 7 shows the plots of FIG. 5 in greater detail in the region from 605 to 615 m/z. As seen from FIG. 7, only the m/z 609.23 peak was selected for dissociation.

Figure 9:
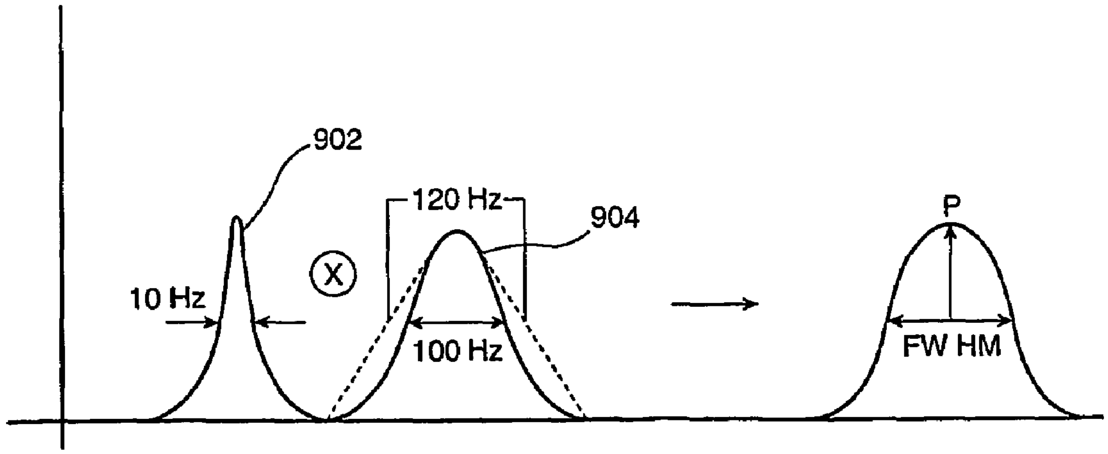
FIG. 9 is a diagram illustrating how resolution of fragmentation is measured in the frequency domain.

Although not intending to be bound by the following theory, it is believed that the relatively high resolution of fragmentation is achieved because resonant excitation takes place in a relatively low pressure environment. Calculations have indicated that the spread or variation in ions' secular frequency at this low pressure is approximately 100 Hz. The excitation period is relatively long, at 50–100 ms. As shown in FIG. 9, resolution can be understood from the convolution of two signals 902 and 904 in the frequency domain. Signal 902 represents the excitation pulse. At 100 ms, the excitation pulse has a FWHM spread of about 10 Hz as determined by its Fourier transform. Signal 904 represents the variation in the secular frequency, which has a spread of about 100 Hz. Resolution can be measured by convolving these two signals and measuring the frequency of the product signal divided by FWHM value.

Figure 8:
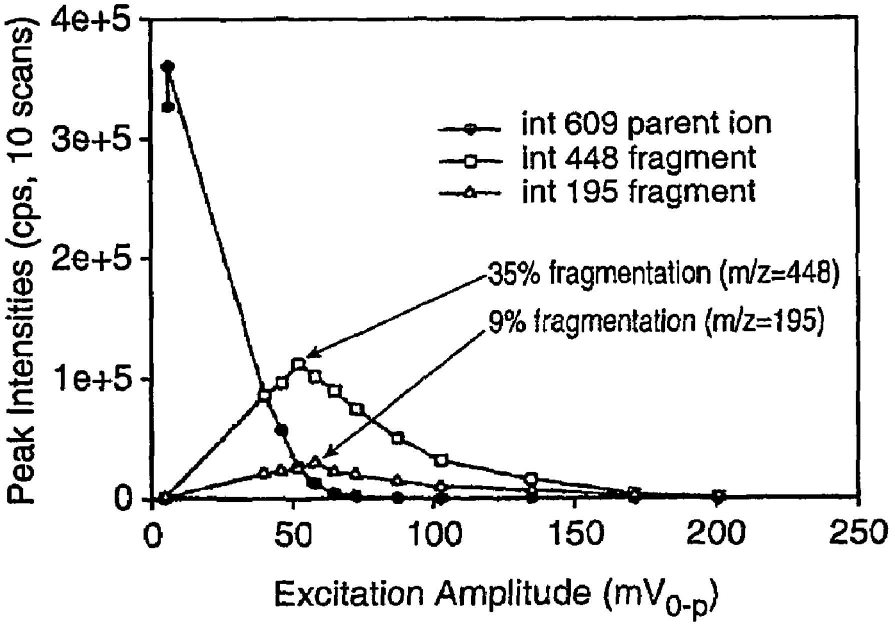
FIG. 8 is a graph which plots parent and fragment ion intensity of the reserpine ions as a function of resonant excitation amplitude, using the first test instrument.

The efficiency of fragmentation depends to some extent on the amplitude of the resonant excitation signal. For example, FIG. 8 shows the intensity of reserpine fragments (dissociated from parent ion m/z=609.23) as a function of excitation amplitude, the excitation frequency being set to 60.37 kHz, q=0.2075, with neutral gas pressure in Q3 being approximately $2.7\times10^{-5}$ Torr as measured in the chamber. The plots reach a maximum and then begin to decline in intensity as ejection of the ions from the linear ion trap, Q3, begins to become significant. This is because a "competition" exists between fragmentation and ejection. The higher the amplitude of the resonant excitation signal, the more likely ions will eject.

Figure 10:
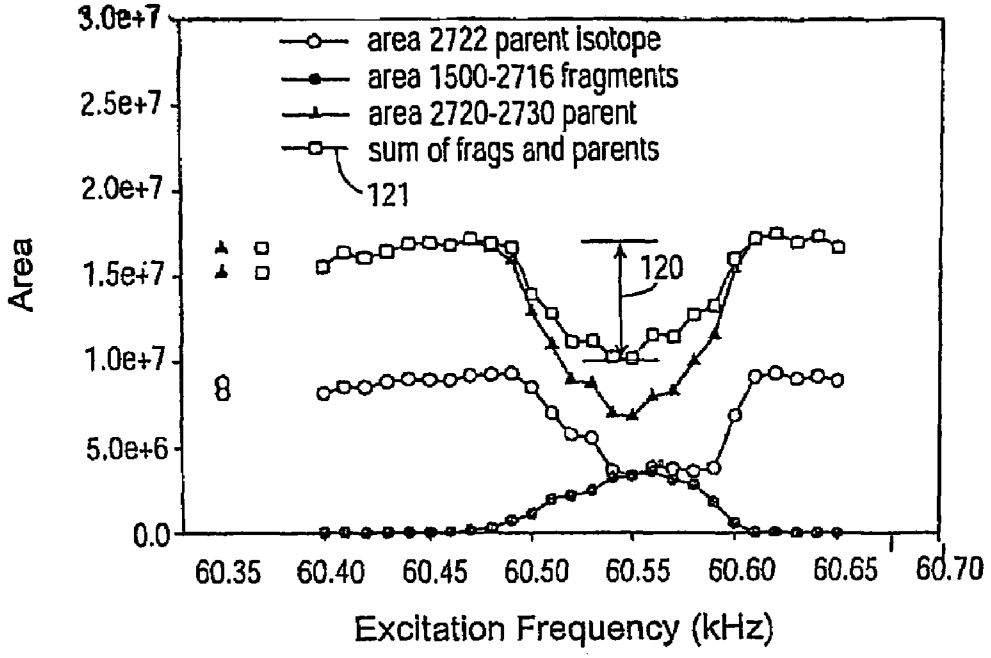
FIGS. 10 and 11 are graphs which plot parent and fragment ion intensities of ions from an Agilent™ tuning solution as a function of differing resonant excitation amplitudes, using the first test instrument.
Figure 11:
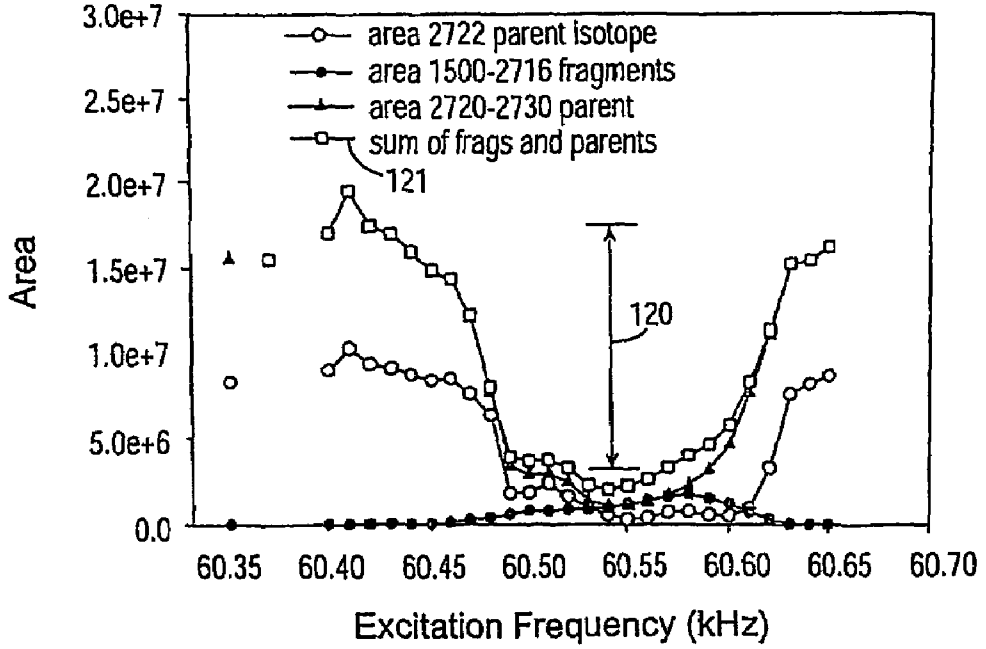

As a further example, FIG. 10 shows the intensity of fragments, parent ion and parent ion isotopic cluster during the fragmentation of a 2722 m/z cluster Agilent™ tuning solution as a function of excitation frequency. The experiment was carried out using the same test instrument used to produce FIGS. 3–8. The excitation was carried out at q=0.207 for 2722 m/z. The excitation amplitude was 100 $mV_{(0\text{-}pk)}$. The experiment demonstrated an approximately 21% fragmentation (1500–2716 m/z) of the parent cluster (2720–2730 m/z). Approximately 30% of the ions are ejected from the linear ion trap, Q3, as measured by a difference 120 between a baseline intensity and the point of peak fragmentation in the plot 121 which measures the intensity of the combined parent and fragment ions. In this data the excitation signal was applied for a period of 200 ms and the pressure in linear ion trap was measured at 2.3e-5 Torr. Decreasing the excitation amplitude (other operating parameters remaining the same) resulted in less fragmentation and less ejection. Increasing the excitation amplitude to 150 mV (other operating parameters remaining the same) results in even more ejection of the parent ions without increasing the degree of fragmentation, as shown in FIG. 11.

Figure 12A:
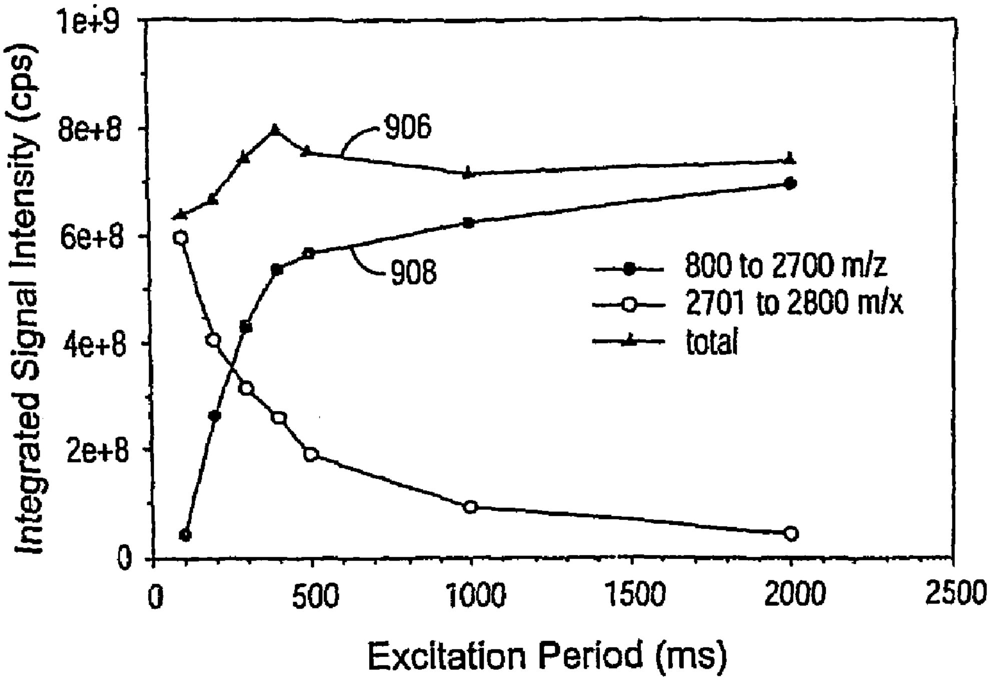
FIGS. 12A and 12B are graphs which plot parent and fragment ion intensities from an Agilent™ tuning solution over varying time periods and amplitudes, respectively, using a second test instrument constructed according to the first embodiment.

FIG. 12A plots the fragmentation of an Agilent™ tuning solution component over varying excitation periods. This plot was taken using an instrument constructed similarly to the instrument (but not the same) used to generate the plots of FIGS. 3–11. The excitation frequency was 59.780 kHz, excitation amplitude 280 mV, q=0.205. The fragmentation efficiency increases rapidly (as indicated by plot 908) up to an excitation period of about 500 ms, after which there is not a significant gain in efficiency. Ejection appears to be relatively constant, as indicated by the relatively flat profile of plot 906. Fragmentation efficiencies in this plot appear to be higher than for the plot shown in FIG. 8, likely due to the fact that another test instrument was employed, using rod sets that did not have exactly the same profile as those of the instrument used to obtain the plot in FIG. 8.

Figure 12B:
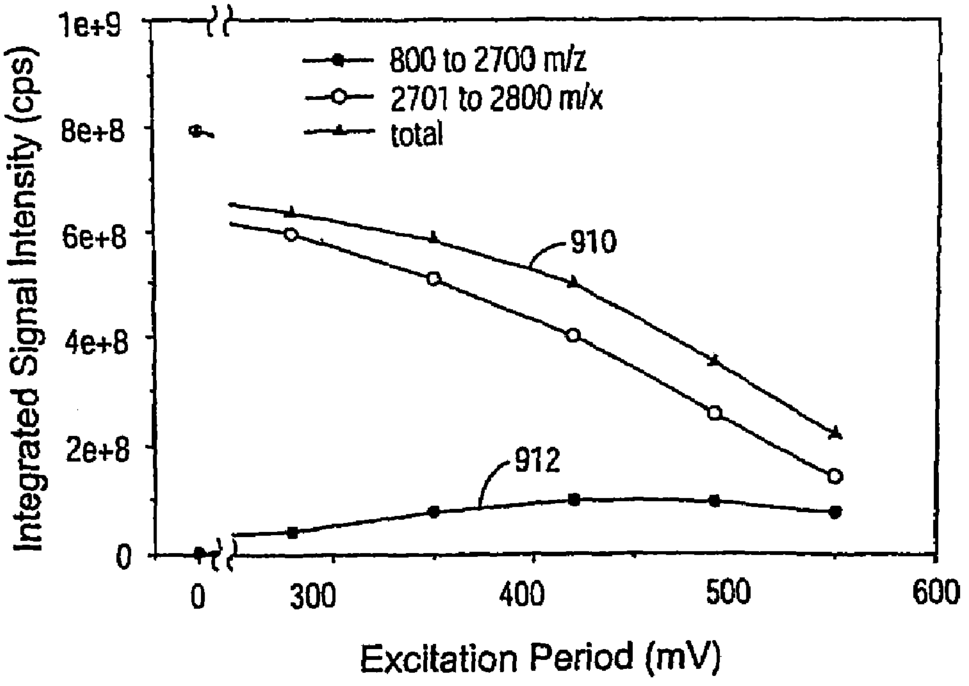

FIG. 12B plots the fragmentation of the 2722 m/z ion as a function of excitation amplitude. In this data the excitation frequency was 59.780 kHz, applied for 100 ms, q=0.205. The data shows that at higher amplitudes, the intensity of the 2722 m/z cluster and its fragments, indicated by plot 910, dips considerably, implying increasing ejection of ions. However, fragmentation efficiency, indicated by plot 912, appears to increase slightly. By extrapolating plots 910 and 912 it appears that a practically significant fragmentation efficiency can be achieved at excitation amplitudes as high as 1 $Volt_{(0\text{-}pk)}$.

Thus, it will be seen that fragmentation efficiency depends on a variety of factors, including the exact shape or profile of the rod sets employed, the q factor, the particular type of ion that is being fragmented, and the amplitude of the resonant excitation frequency.

In particular, as shown in FIGS. 8, 10–11 and 12A–12B, the fragmentation efficiency can vary significantly depending on the amplitude of the resonant excitation signal. It is not always possible to know the optimal amplitude in advance. However, as discussed next, the low pressure linear ion trap can be modified to increase fragmentation efficiency at any given excitation amplitude, and to allow for higher excitation without significantly increasing the likelihood of ejection over fragmentation.

Figure 13A:
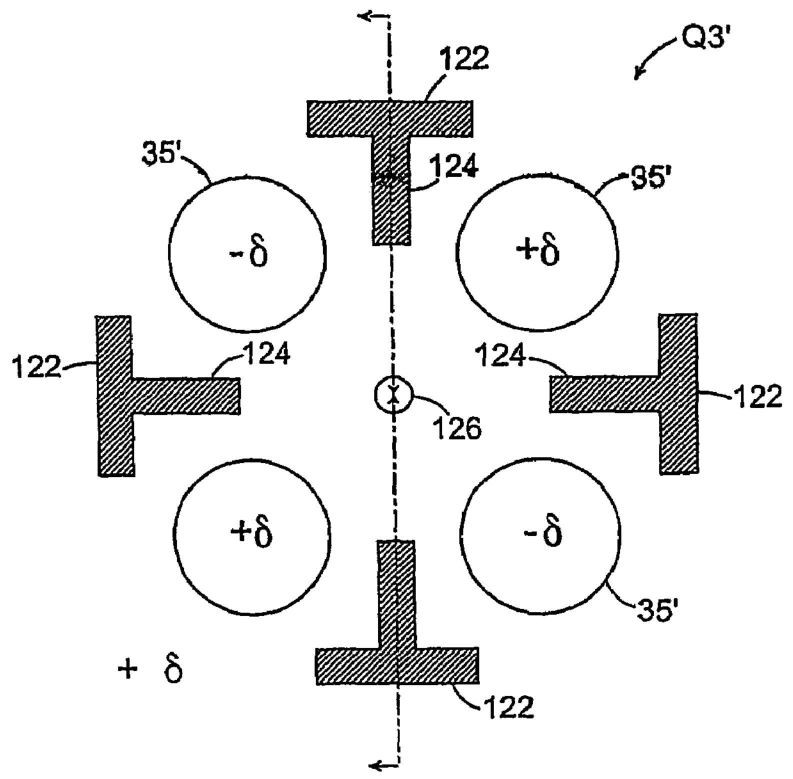
FIG. 13A is a radial cross-sectional view of a linear ion trap in a triple quadrupole mass spectrometer according to a second embodiment, which employs a series of linacs (electrodes) in addition to a quadrupolar rod set.
Figure 13B:
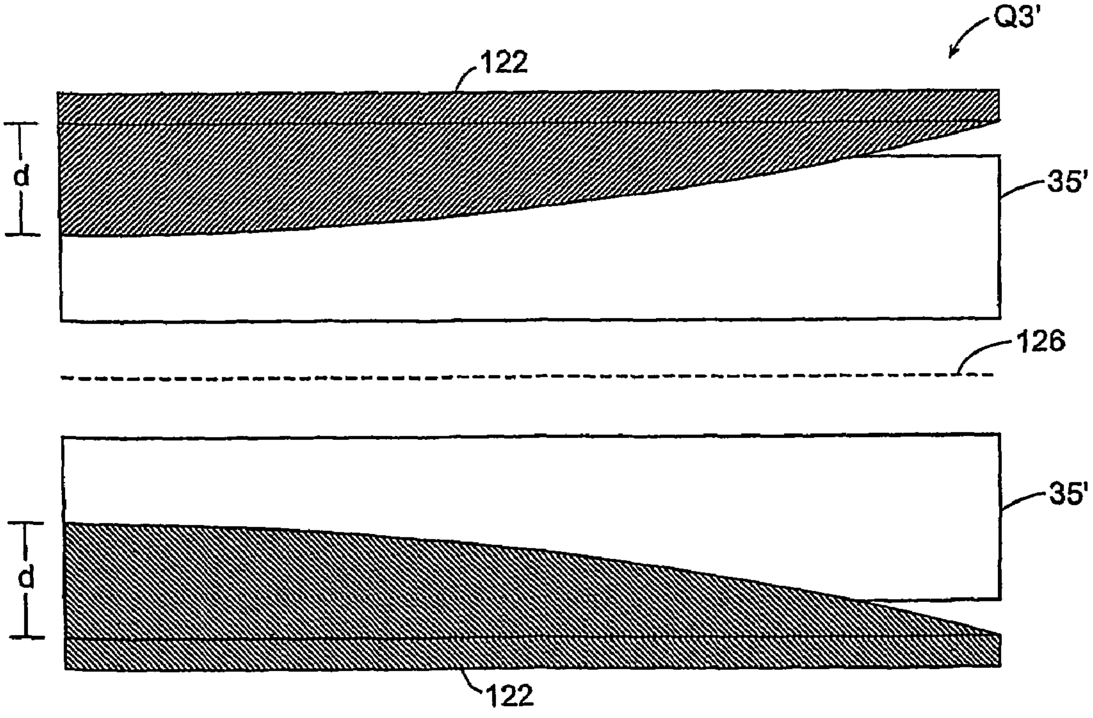
FIG. 13B is an axial cross-sectional view of the linear ion trap shown in FIG. 12A.

FIGS. 13A and 13B respectively show radial and axial cross-sectional views of a modified linear ion trap Q3' in a mass spectrometer according to a second embodiment. Only Q3' shown, since the second embodiment is similar in its other constructional and operational details to the mass spectrometer of the first embodiment discussed above. In the second embodiment, each quadrupole rod 35' of Q3' is circular in cross-section, approximately eight inches in length, and constructed from gold-coated ceramic. The drive frequency of this quadrupole is 816 kHz. "Manitoba" style linacs, which constitute four extra electrodes 122*a*–*d*, are introduced between the main quadrupole rods 35' of Q3'. While a variety of electrode shapes are possible, the preferred electrodes have T-shaped cross-sections, including stems 124. In the illustrated embodiment, the depth, d, of each stem 124 protruding towards the longitudinal central axis 126 of Q3' varies from 4.1 mm to 0 mm, as seen best in FIG. 13B. At the point of the greatest depth, the stem 124 of each electrode 122 is situated approximately 8.5 mm from the central longitudinal axis 126.

The linac electrodes are preferably held at the same DC potential, e.g., zero volts. A DC potential difference δ is applied between the linac electrodes 122 and the quadrupole rods 35', resulting in a generally linear potential gradient along the longitudinal axis 126 of the linear ion trap. See Loboda et al., "Novel Linac II Electrode Geometry for Creating an Axial Field in a Multipole Ion Guide", Eur. J. Mass Spectrom., 6, 531–536 (2000), the entire contents of which are incorporated herein by reference, for more information regarding the characteristics of the potential gradient. The addition of the linac electrodes 122 introduces a complicated DC field which can be approximated by an octopole field when higher order terms are neglected, i.e.

$$U_{o,\mathrm{DC}}(r,\theta)=\Delta U_a\frac{\cos(4\theta)r^4}{R^4}$$

where $\Delta U_a$ is the potential difference along the axis of the quadrupole, R is the field radius of the quadrupole (4.17 mm in the illustrated embodiment) and r and θ are cylindrical coordinates. The linac electrodes 122 also provide higher order multipole fields to the RF trapping field, the importance of which is discussed below.

Figure 14:
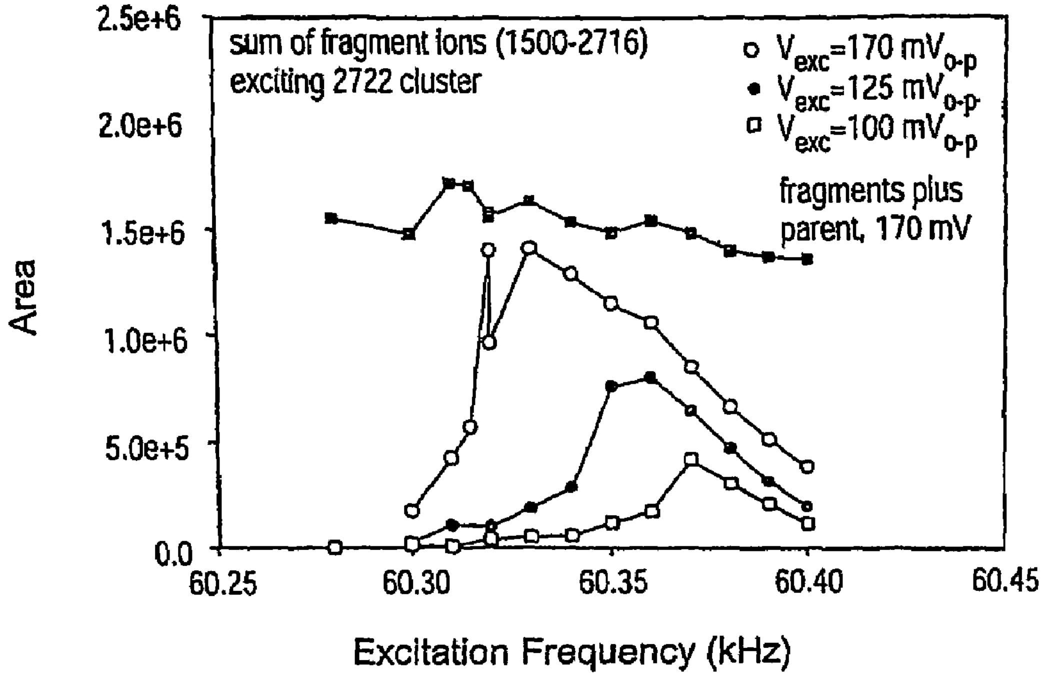
FIG. 14 is a graph showing the fragmentation of an Agilent™ tuning solution component as a function of excitation frequency and amplitude using the second embodiment.

FIG. 14 shows the experimental results of fragmenting the 2722 m/z tuning solution as carried out using the mass spectrometer of the second embodiment. The fragmentation efficiency for the 2272 m/z tuning solution increased when a potential difference of δ=160V was applied between the linac electrodes 122 and the quadrupole rods 35'. In these experiments the excitation period was still 200 ms, and fragmentation was carried out using excitation amplitudes of 100, 125 and 170 mV. The line of solid squares 130 show the intensity of the fragments plus parent ions for the 170 mV experiments. At the peak 132 of the 170 mV data 130 (the peak occurring at 60.33 kHz), the fragments represent more than about 85% of the starting parent ions. The remaining parent ions (not shown) represent about 14% of the initial parent ion intensity. This implies a nearly 0% ejection of parent ions during the excitation process.

The excitation profile for the 170 mV data 132 is slightly distorted and broader than the excitation profile shown in FIG. 10, which was taken under an excitation amplitude of 100 mV. This is most likely due to the varying stem length of the linac electrode 122 which will introduce different amounts of DC octopole content as a function of z, the distance along the longitudinal axis 126 of the linear ion trap Q3'.

The second embodiment provides increased fragmentation efficiency relative to the first embodiment. The superior results are believed to arise from the interplay between the quadrupolar field used to trap ions in Q3' and the superimposed octopole field. Calculations indicate that the amount of octopole content in the trapping field at the central longitudinal axis 126 is a maximum of approximately 2% (at the point of greatest stem depth) at high m/z, e.g., m/z=2722, depending on the magnitude of the RF quadrupolar field, so ions located near the central longitudinal axis 126 will predominantly experience the effects of the trapping quadrupolar RF field. Ions located further away from the central longitudinal axis experience the effects of the octopole field more substantially. In an octopole field, the secular frequency for a given ion is dependant on the displacement from the central longitudinal axis 126. (In a quadrupolar field the secular frequency is independent of this displacement.) The higher the octopole content the greater the perturbation to the frequency of the ion motion when compared to the quadrupolar trapping potential. Hence, applying the resonant excitation signal resonantly excites ions at the secular frequency near the central longitudinal axis 126. As the radial displacement of the ions increase, the ions will fall out of resonance when the octopolar field shifts the ions' frequency of motion. The ions fall out of resonance with the excitation frequency and are no longer excited by the resonant excitation signal. When the ions radial displacement decreases, the ions can then be re-excited. Thus, the octopole field dampens the extent of the oscillatory motion. This results in less radial ejection of ions in a given time frame thus affording the ions a greater opportunity to dissociate by collision with the background gas molecules. It also enables a resonant excitation signal of greater amplitude to be used than otherwise practicable.

Figure 15:
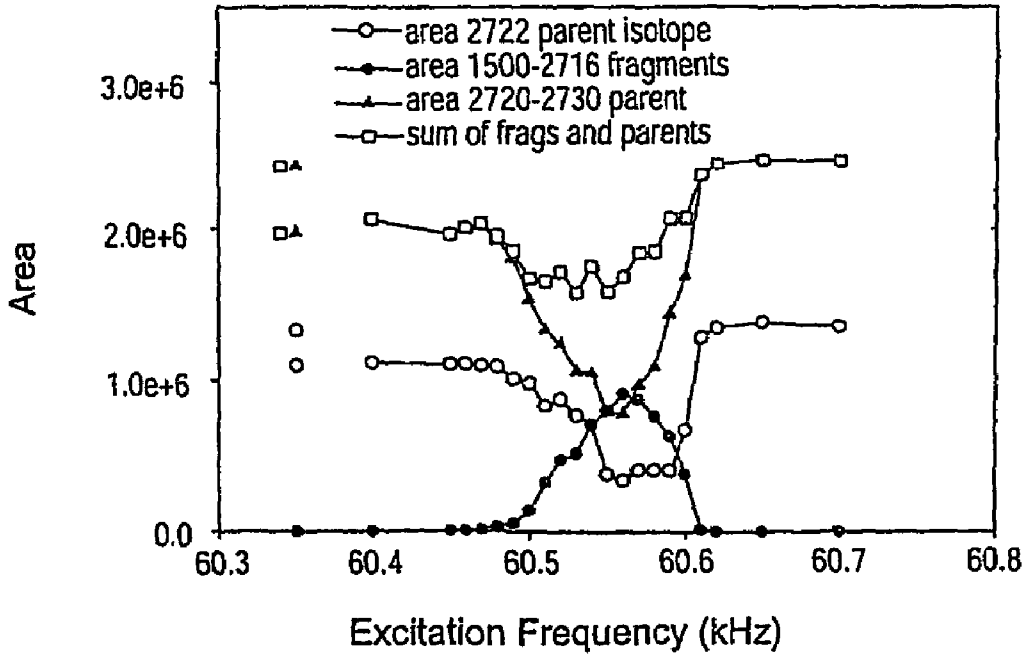
FIGS. 15 and 16 are graphs showing the fragmentation of an Agilent™ tuning solution component as a function of excitation frequency and amplitude using the second embodiment under operating conditions where the linacs are held to the same potential as the quadrupole rods.
Figure 16:
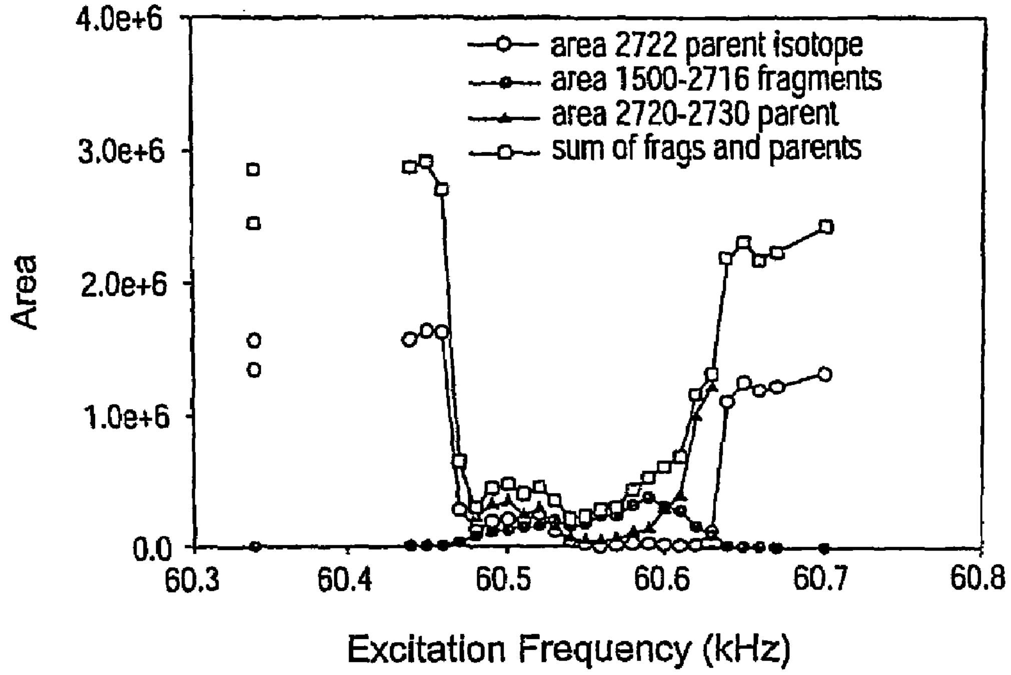

Excitation profiles were also measured with the linac electrodes 122 set to the same potential ±δ as the DC offset voltage applied to the rods 35'. This gives a potential difference δ of 0 V and effectively reduces the axial gradient to zero and minimizes the DC octopole contributions from the linac electrodes. The results are shown in FIGS. 15 and 16 for excitation amplitudes of 100 and 170 mV, respectively. These results are similar to the results with no linac electrodes shown in FIGS. 10 and 11, i.e., there is an increased degree of parent ion ejection.

One of the issues that arises in the use of the modified linear trap Q3' is its performance as a mass analyzing quadrupole when the linac electrodes are in place. Initially it was assumed that the performance would be degraded due the presence of the higher order fields caused by the linac electrodes 122. However, it was thought these effects could be minimized if the electrodes 122 were at a potential that did not vary during the operation of the quadrupole. Such a potential contour exists when the RF potentials on the poles are identical with the exception of a 180 degree phase shift.

Figure 17:
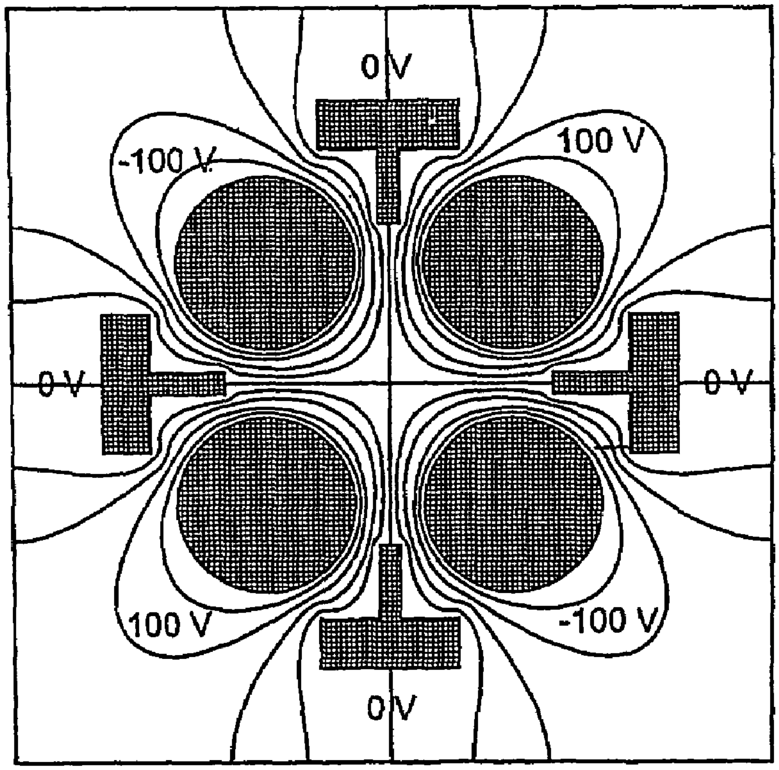
FIG. 17 is a field diagram showing potential contours in the linear ion trap of the second embodiment.

This is shown in FIG. 17 where the potential contours (represented by contour lines 140) passing through the linac electrodes do not change as the RF fields vary. In the case of FIG. 17 these are the 0 V contours. (This potential will change with the float potential of the quadrupole and will match the float potential.)

Figure 18:
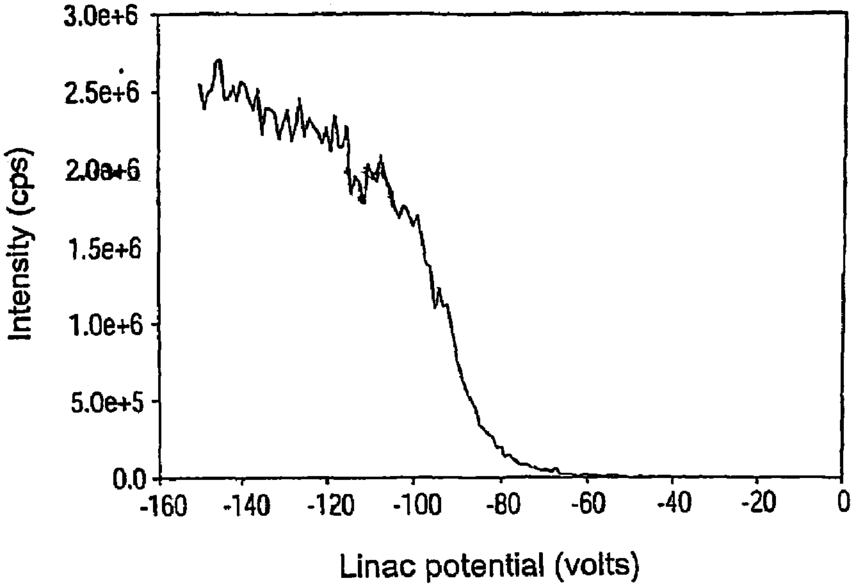
FIG. 18 is a graph showing the signal intensity during a mass analysis of an Agilent™ tuning solution component as a function of linac potential.
Figure 19:
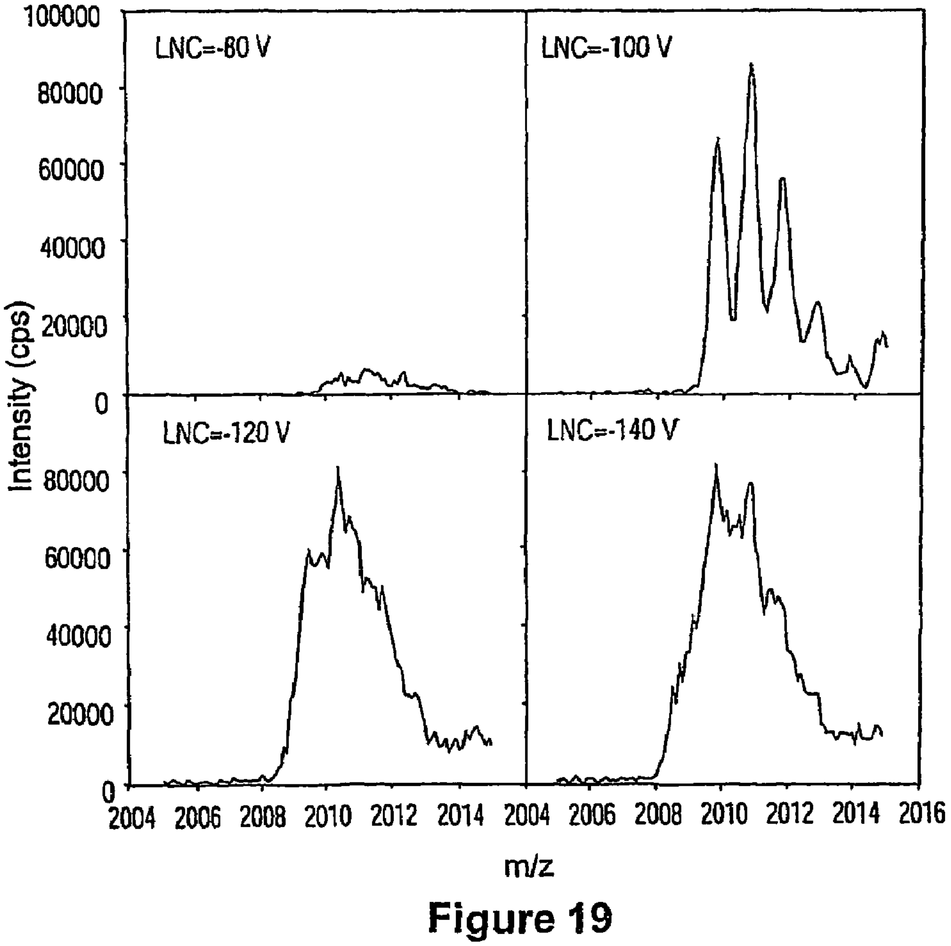
FIG. 19 is a series of graphs showing various mass spectrums obtained by the second embodiment as a function of linac potential.

It was found experimentally that in order to minimize the effects of the linac electrodes 122 on the analyzing quadrupole it was necessary to adjust the DC potential on the linac electrodes. This is believed to be the result of the finite width of the stem 124 on the linac electrode 122 which still introduces some higher order fields to the analyzing fields. For example, FIG. 18 shows total ion current of the signal for the m/z 2010 ion cluster in a mass analyzing scan obtained in Q3'. FIG. 19 shows the mass spectra taken at each of the indicated linac potentials. The signal is an average of the total ion current over a 5 volt window. For example, the mass spectrum at δ=−100 V actually is the sum of the ion signals covering the range from approximately −97.5 to −102.5 volts on the linac. The 5 volt window is scanned across the spectrum in FIG. 18 to determine the optimum linac potential.

Figure 20:
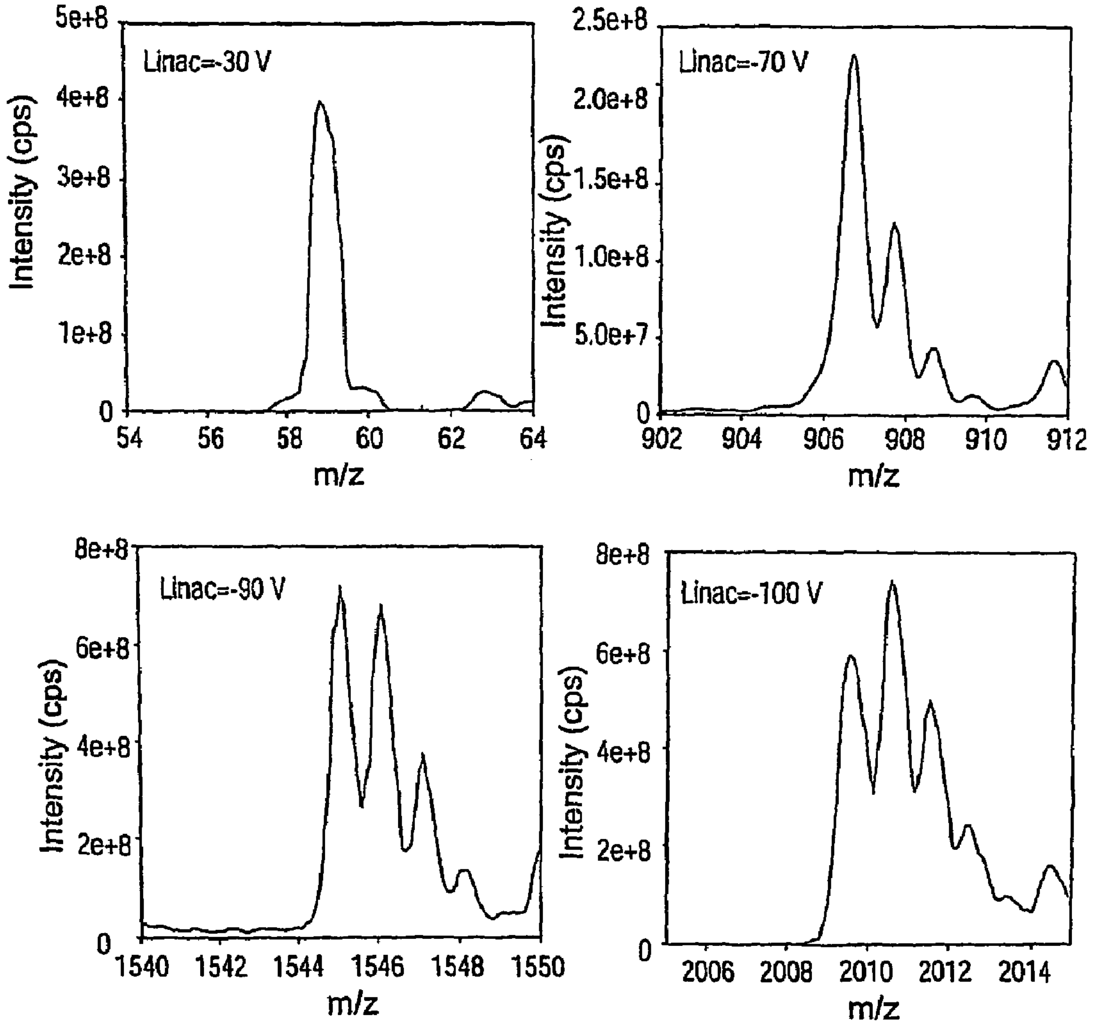
FIG. 20 is a series of graphs showing optimal linac potential to reduce any distorting effects introduced by the linacs when the linear trap is used as a mass resolving quadrupole in a non-trapping mode.

FIG. 20 shows that these effects can be minimized by ramping the DC potential on the linac electrodes as the RF/DC potentials (proportional to mass) on Q3' are scanned. These plots show the linac potential which provides a spectrum that most closely resembles the spectrum that would have been obtained had the linac electrodes not been installed. The Q3' DC offset potential δ was −24 V for this set of data in FIG. 20.

In the alternative, in some instances the DC offset voltage on the quadrupole rods may be varied and the DC voltage on the linacs may be kept steady to achieve the same effects.

Figure 21:
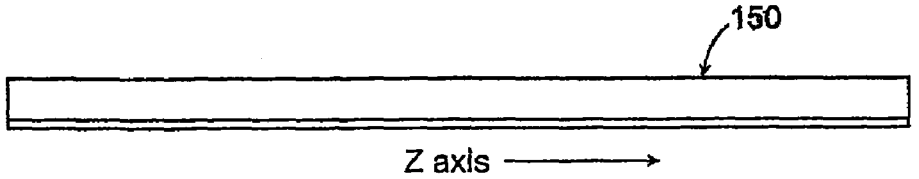
FIGS. 21 and 22 are elevation and end views, respectively, of alternatively shaped electrodes for use in the second embodiment.
Figure 22:

When a potential difference is applied between the linac electrodes and the rods 35', an axial gradient is generated in Q3' which causes the ions to move towards one end of the trap. Differently shaped electrodes can be used depending upon the spatial profile or excitation profile that is desired. The poor shape of the excitation profile shown in FIG. 14 as a result of the varying stem length of the linac can be ameliorated through the use of electrodes 150 such as shown in FIGS. 21 & 22 where the stem length is constant. This will produce less of a distortion in the excitation profile as illustrated with reference to FIGS. 23–26. The experiments shown in these drawings was carried out using the same test instrument used to generate the data of FIGS. 11 and 12, with auxiliary electrodes 150 having a constant stem length of 2 mm replacing the tapering electrodes 122 (FIGS. 13A, 13B).

Figure 23:
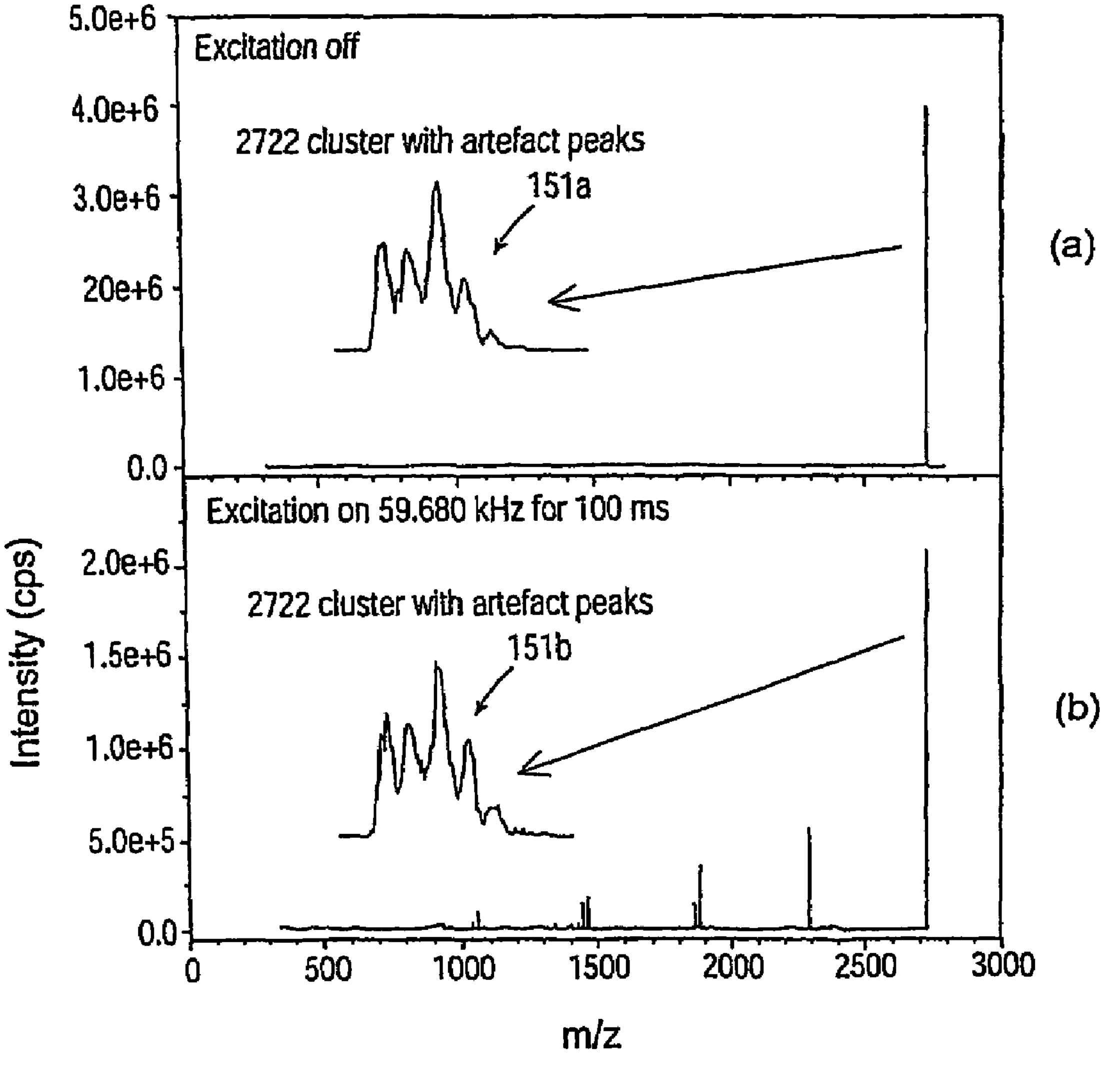
FIG. 23 shows MS and $MS^2$ spectrums of an Agilent™ tuning solution component using a triple quadrupole mass spectrometer according to a third embodiment, in which the third quadropole/linear ion trap employs the auxiliary electrodes shown in FIGS. 21 and 22 to create higher order fields.

FIG. 23(*a*) shows the mass spectra (without excitation) for the Agilent™ ion cluster at 2722 m/z, a detail view of the 2722 m/z cluster being provided at 151*a*. FIG. 23(*b*) shows the mass spectra of the 2722 m/z ion cluster excited at 59.86 kHz, a detail view of the 2722 m/z cluster being provided at 151*b*. Fragments are seen extending towards 1000 m/z. The low mass cut-off for this spectrum is calculated at 615 m/z (2733 m/z*0.205/0.907). In these figures the potential of the auxiliary electrodes 150 is the same as the dc potential applied to the Q3' quadrupole. The effect of the auxiliary electrodes 150 is minimized (minimal dc octopole content) in this situation. The 2722 m/z cluster was transmitted into the Q3' linear ion trap by having the Q1 quadrupole set to resolving mode with open resolution. Open resolution transmit about a 6 to 8 Da window.

Figure 24:
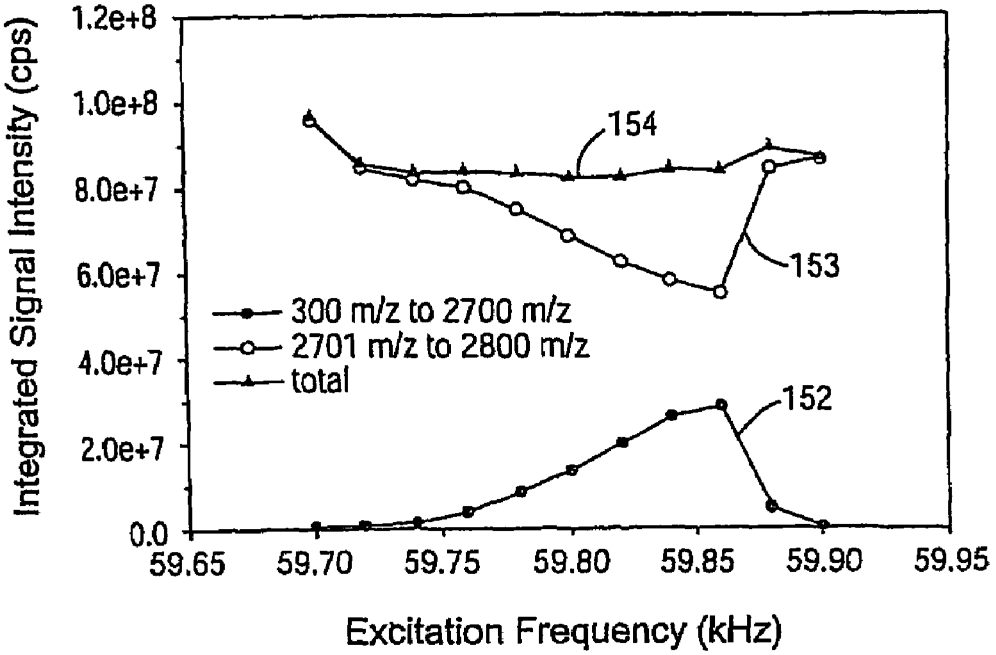
FIG. 24 is a graph which plots the fragmentation of the Agilent™ tuning solution as a function of excitation frequency, using the third embodiment with the excitation amplitude being set to 360 $mV_{(0\text{-}pk)}$ and under operating conditions where the auxiliary electrodes are held to the same potential as the quadropole rods.
Figure 25:
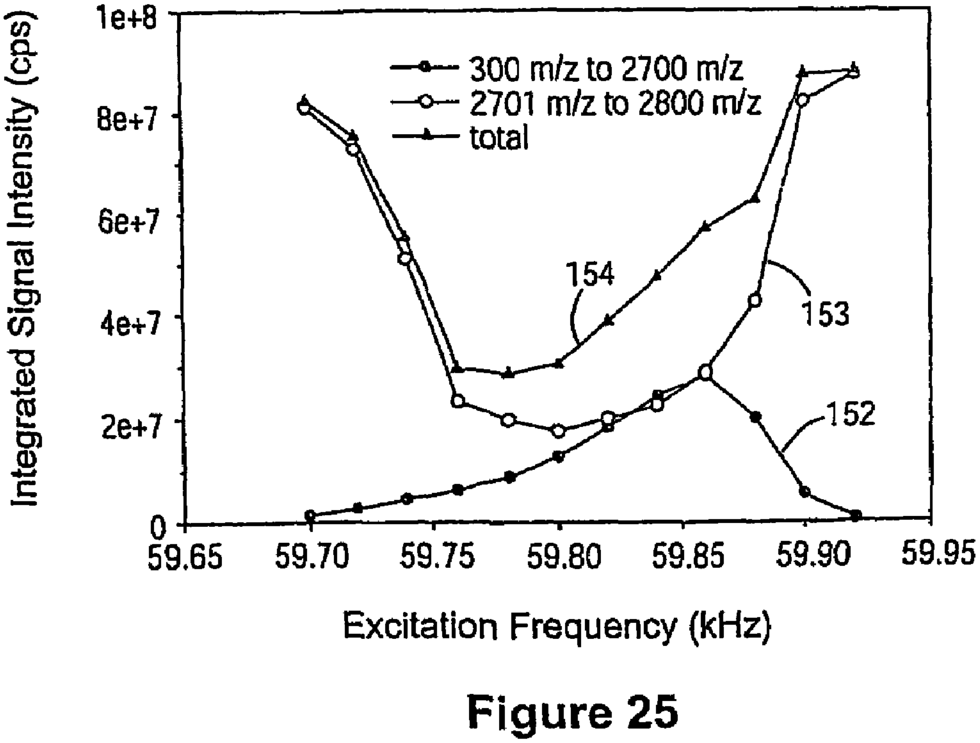
FIG. 25 is a graph which plots the fragmentation of the Agilent™ tuning solution as a function of excitation frequency using the third embodiment, with the excitation amplitude being set to 530 $mV_{(0\text{-}pk)}$ and under operating conditions where the auxiliary electrodes are held to the same potential as the quadrupole rods.

FIG. 24 shows the excitation profile when exciting with an amplitude of 360 mV. The line of solid circles 152 show the integrated intensity of the ion fragments coving the range 300 to 2700 m/z. The line of open circles 153 show the integrated intensity of the range 2701 to 2800 m/z, which is the integrated intensity of the 2722 m/z cluster. The line of solid triangles 154 show the integrated intensity of the entire spectrum. At an excitation amplitude of 360 mV, applied for 100 ms, approximately one-third of the 2722 m/z cluster is dissociated to form fragment ions. At the same time almost no ions are ejected from the trap as demonstrated by the constant total (300 to 2800 m/z) ion intensity. Increasing the excitation amplitude to 530 mV does not lead to an increase in the number of ion fragments, as shown in FIG. 25. Instead, there is an increase in the number of ions ejected as demonstrated by the decrease in the total number of ions in the trap.

Figure 26:
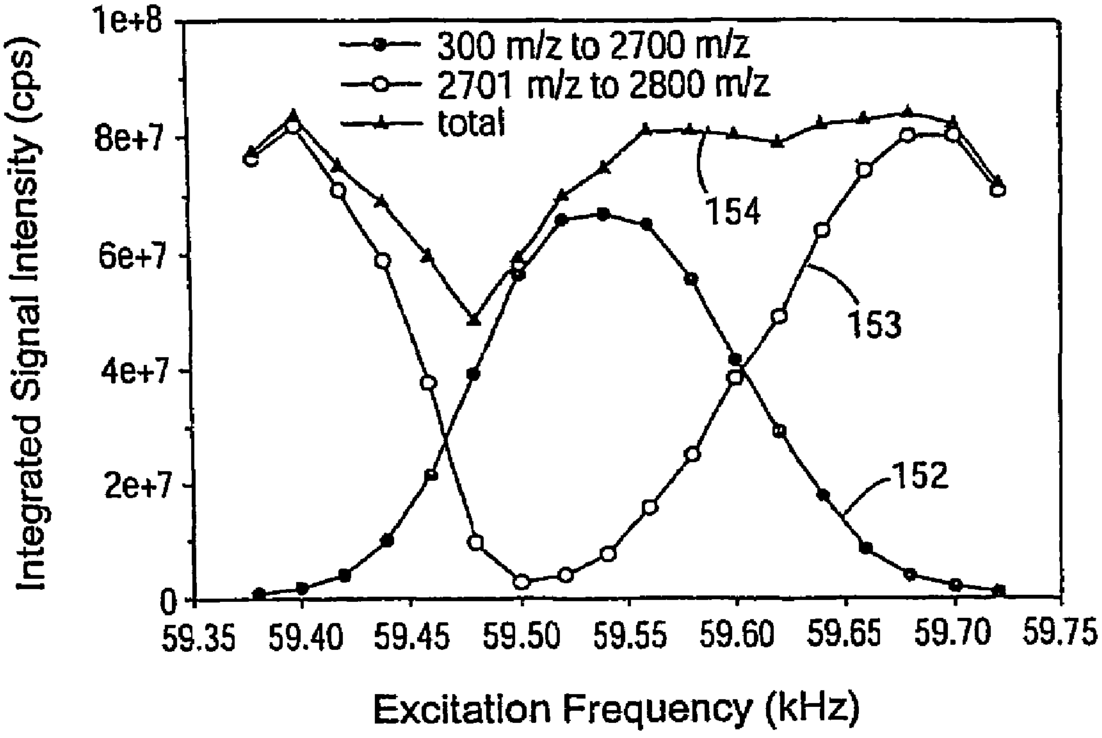
FIG. 26 is a graph which plots the fragmentation of the Agilent™ tuning solution as a function of excitation frequency using the third embodiment, with the excitation amplitude being set to 900 $mV_{(0\text{-}pk)}$) and under operating conditions where a 120V potential difference exists between the auxiliary electrodes and the quadrupole rods.

Changing the potential of the auxiliary electrodes 150 to −40 V creates a DC potential difference of 120V between the Q3' quadrupole (−160 V) and the auxiliary electrodes 150. This creates an added DC octopole component to the trapping potential. The 2722 m/z cluster can now be excited with a higher degree of fragmentation. This is shown in FIG. 26 where the fragmentation efficiency is around 80%. This is a factor of about a 2.4 increase in fragmentation efficiency from when the octopole content was minimized in FIGS. 24 and 25. In FIG. 26 the excitation amplitude was increased to 900 mV, applied for 50 ms. There is some ejection of ions on the low frequency side of the excitation profile. Without the added octopole content an excitation amplitude of 900 mV would have resulted in significant ejection of the 2722 m/z cluster with minimal fragmentation, if any.

It is also contemplated to use two electrodes 122 and two electrodes 150, as shown more clearly in the cross-sectional view of Q3' in FIG. 27, in conjunction with the isolated side and end views of electrodes 150 in FIGS. 28, 28B and the isolated side and end views of electrodes 122 in FIGS. 29A, 29B. In such an embodiment, applying a potential difference between the rods 35' and electrodes 150 while maintaining the potential difference of zero volts between electrodes 122 and the rods 35' produces a reasonable excitation profile. After resonant excitation the potential difference between the rods 35' and electrodes 122 may be increased to produce an axial gradient causing the ions to move towards the exit lens 40. This is illustrated with reference to FIGS. 30–31. Adding one pair of linac electrodes 122 (as shown in FIGS. 27–29) produces an axial gradient along the central longitudinal axis 126 which can be used to reduce the presence of any artifacts that may be present. The axial field gradient will be less than that provided when there are four linac electrodes 122 present, but it is still sufficient to reduce/eliminate the artifacts. As shown by the spectrum in FIG. 30. Use of these mixed pairs of electrodes 122, 150 also produces a distorted potential which is no longer described simply by the addition of a dc octopole to a substantially quadrupolar field.

Figure 30:
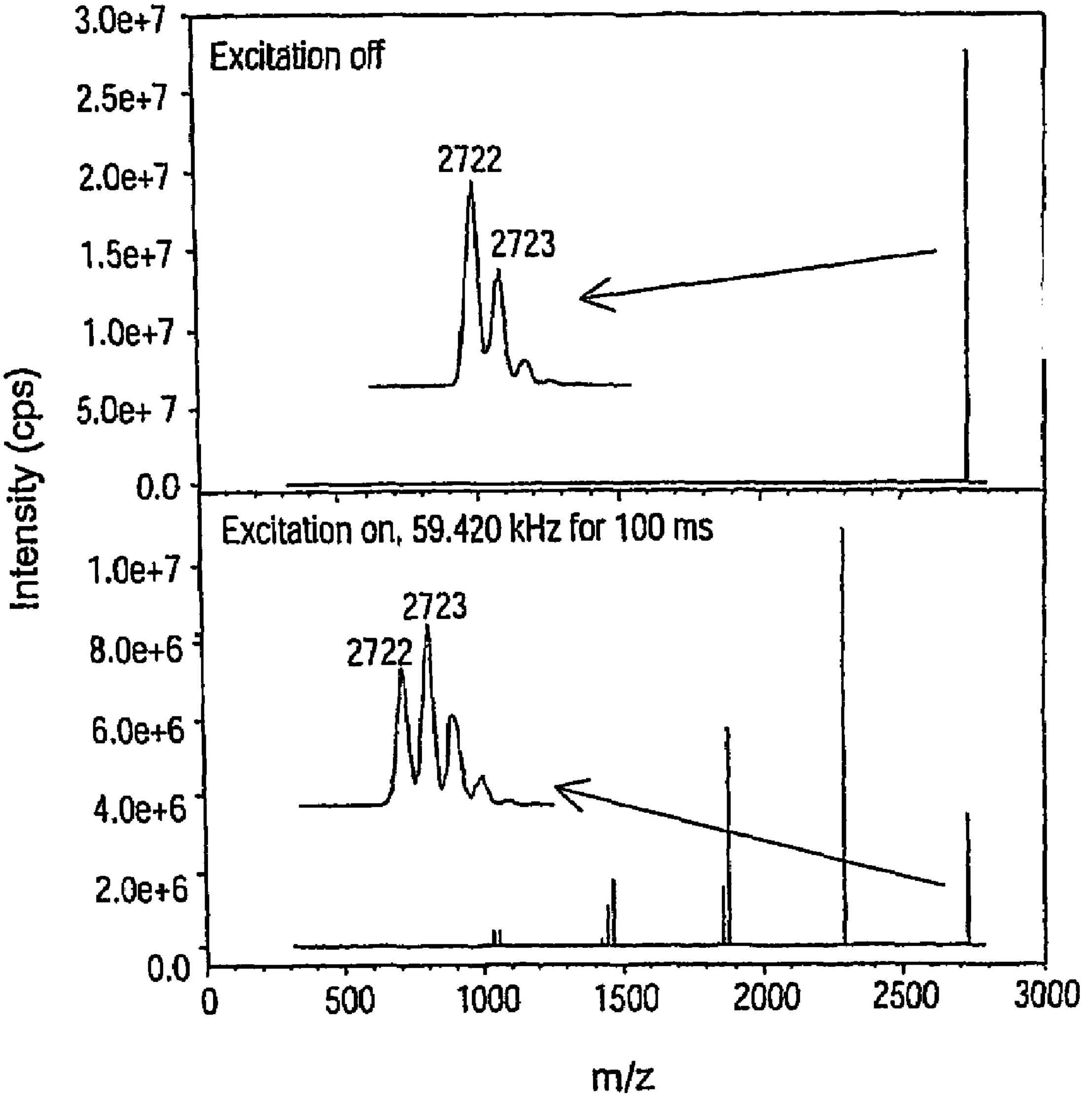
FIG. 30 shows MS and $MS^2$ spectrums of the Agilent™ tuning solution using the fourth embodiment.
Figure 31:
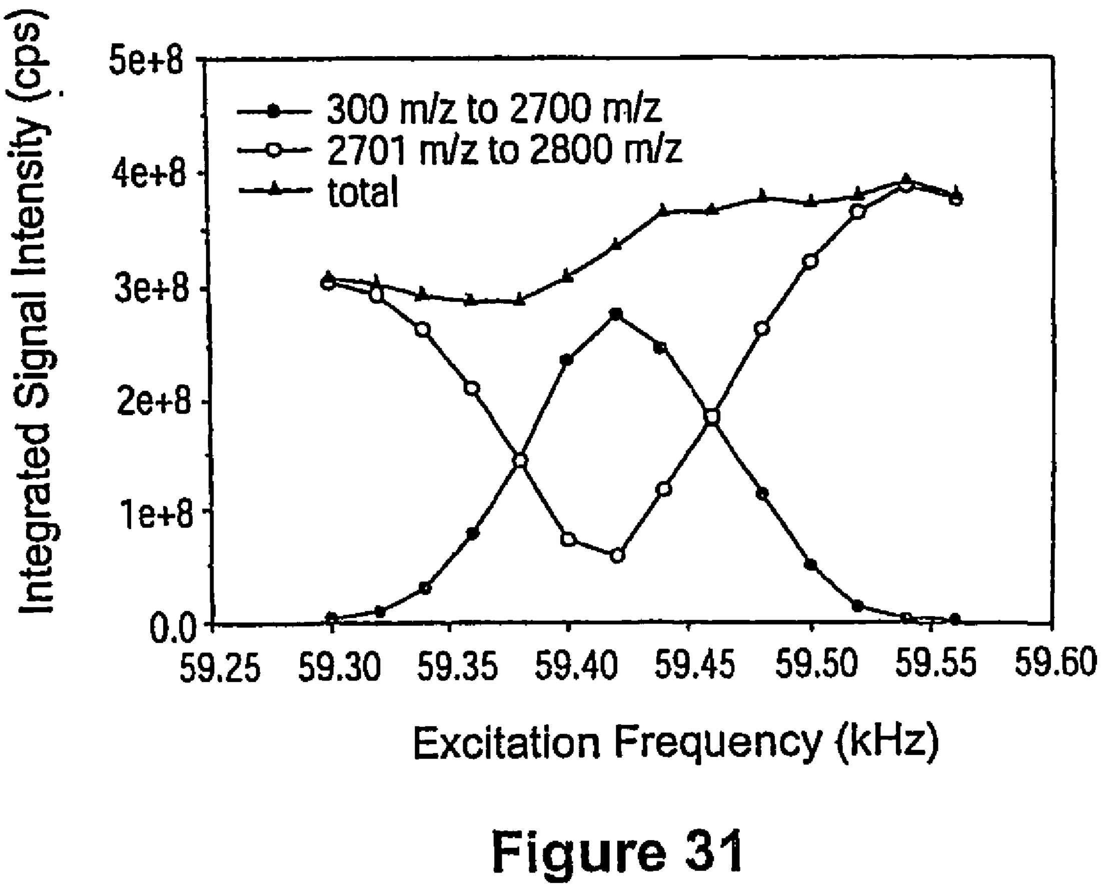
FIG. 31 is a graph which plots the fragmentation of the Agilent™ tuning solution as a function of excitation frequency using the fourth embodiment.

In FIG. 30 the excitation of the 2722 m/z cluster was carried out at 59.420 kHz for a period of 100 ms at an excitation amplitude of 1000 $mV_{(0\text{-}pk)}$. There are no artifacts present as was the case in FIG. 23 where no linac electrodes 122 were used. During the excitation process the linac electrodes 122 were set to a potential of 160 V (the same as the DC offset potential for the Q3 rod set). The other electrodes 150 were set to a potential of 0 Volts, i.e. δ=160V. After the excitation was completed a potential of 0 V was applied to the linac electrodes causing a gradient along the longitudinal central quadrupole axis 126. This gradient removed the artifacts and additionally increased the total number of ions detected (compare the vertical scales of FIGS. 24–26 to the vertical scale of FIG. 31). FIG. 31 plots the fragmentation profile as a function of excitation frequency, the excitation amplitude being set at 1000 mV for a period of 100 ms. The amount of fragment ions collected correspond to about 75% fragmentation efficiency of the 2722 m/z cluster. This data demonstrates that even with only two of the auxiliary electrodes 150 present there is still enough distortion of the potential to lead to an increase in fragmentation efficiency via the use of higher order fields.

While the illustrated embodiments have been described with a certain degree of particularity for the purposes of description, it will be understood that a number of variations may be made which nevertheless still embody the principles of the invention. For example, the frequency of the resonant excitation signal has been described as equal to the fundamental resonant frequency $\omega_0$ of the ion selected for fragmentation. In alternative embodiments the excitation frequency can be stepped or otherwise varied through a range of frequencies about or near $\omega_0$ over the excitation period. This would ensure that all closely spaced isotopes of an ion are dissociated, if desired. The frequencies could be stepped through discretely, as exemplified by the 20 Hz increments in FIG. 4, or continuously over the excitation period. The range could be preset, for example, ±0.5% of $\omega_0$ or some other predetermined percentage. Alternatively, the range could be a user-set parameter. The amplitude voltage may be similarly stepped or varied over the excitation period up to a certain point, as exemplified in FIG. 8.

It will also be appreciated that while excitation frequency in the preferred embodiments is set at the fundamental resonant frequency $\omega_0$ of the ion selected for fragmentation, a harmonic of the fundamental resonant frequency could be used in the alternative to resonantly excite the selected ion. In this case, the excitation signal may require a higher amplitude or longer excitation period.

In the illustrated embodiments the auxiliary AC excitation signal has been described as being applied to one of the pole pairs constituting the trap. It will be understood that the excitation signal may be applied to both pole pairs, thus subjecting the trapped ions to an auxiliary oscillating quadrupolar potential. It will also be understood that the excitation signal need not be applied to the rods of the linear ion trap itself. Rather, additional rods or other types of structures can be employed to subject the trapped ions to an alternating dipolar, quadrupolar or higher order potential field in order to resonantly excite selected ions.

In addition, it will be appreciated that the maximum amplitude of the resonant excitation signal that can be applied to the pole pairs(s) to reach a practical fragmentation efficiency—typically considered at that level which yields three times the signal to noise ratio—may vary considerably depending on a number of factors. These factors include the inter-pole distance, the distance between the poles and the central longitudinal axis of the trap; the shape or profile of the poles; the strength of the molecular bonds; and the collision cross-section of the background gas molecule.

Furthermore, while the illustrated embodiments have disclosed the low pressure fragmentation as being conducted within the confines of a linear (2-D) trap, in theory there is no reason why the fragmentation cannot be conducted within a quadrupole (3-D) ion trap. In practice, however, it is difficult to construct a quadrupole (3-D) ion trap capable of operating at ambient pressures on the order of $10^{-5}$ Torr. This is because such traps typically have a relatively small volume but must have sufficient inert gas therein to slow down ions injected into the trap before the RF/DC fields can perform its trapping function. With 3-D traps, ions are injected typically through the ring element. The RF applied to the ring element becomes a barrier field that ions must overcome. So, ions must be energetic to overcome this barrier. The high pressure in the 3-D trap is required to cool the energetic ions. With too low a pressure, too few ions are damped and held in the trap. Too high a pressure and the injected ions may be lost due to collisional scattering. Such traps thus typically operate at ambient pressures on the order of $10^{-3}$ Torr, which limits the obtainable isolation and fragmentation resolutions. On the other hand, the 2-D linear ion trap such as Q3 has an elongated length which provides sufficient axial distance for the ions to collide with a smaller amount of the background gas needed to provide the necessary damping effect prior to trapping. More particularly, ions are injected along the length of the rods of a 2-D trap. During injection, there is no barrier—or the DC on the entrance barrier element is small such that the ions are not required to be too energetic. Nevertheless, the ions have some energy that requires axial distance for collisional cooling. During the fill period, ions traveling along the length and reflected back, due to the exit barrier element, have lost considerable energy. The small amount of DC on the entrance barrier element is sufficient to reflect these ions and prevent them from exiting at the entrance. Once trapping is achieved, resonant excitation can be applied to the thermalized ions to induce either dissociation or ejection as described above.

It will also be understood that a variety of mechanisms can be used for the mass scanning phase after ions are fragmented in the low pressure environment. For example, another mass resolving quadrupole could be installed after the low pressure fragmentation trap such as Q3. Similarly, another 2-D or 3-D linear trap could be installed after Q3. Alternatively, the low pressure fragmentation trap could be coupled to a time of flight (TOF) device in order to obtain a mass spectrum.

The use of linac electrodes 122 and other types of auxiliary electrodes 150 have been described to create a DC octopole field which functions to dampen oscillatory motion of resonantly excited ions moving towards the (radial) periphery of the trap, away from its central longitudinal axis. It will be appreciated that the octopole field can alternatively be an alternating field, and that higher order fields (not necessary octopole) can be used to reduce the effect of the quadrupolar field at the radial periphery of the trap, with an appropriate number of electrodes being employed. Furthermore, it will be understood that the rods of the trap can be circular or hyperbolic in cross-section without a deleterious effect when additional electrodes are provided to dampen the radial oscillatory motion of resonantly excited ions.

Figure 32:
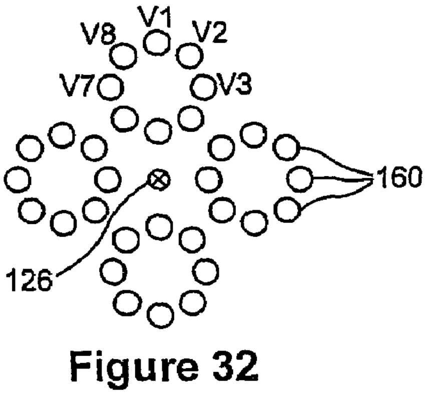
FIGS. 32–34 are cross-sectional views of alternative rod structures for use in any of the foregoing embodiments.

Furthermore, other types of rod profiles can be employed to produce higher (other than quadrupole) fields for improved fragmentation while maintaining the capability of switching to a quadrupole field for mass analysis. For example, each "solid surface" rod 35' in the quadrupole arrangement Q3' can be replaced with multiple parallel wires 160 arranged to form the outline 162 of a cylinder, as shown in FIG. 32. Each wire forms the shape of a cylinder and has a voltage, $v_1$, $v_2$ . . . , $v_n$ supplied to it from individual power supplies. Note: for clarity, only eight such wires 160 with potentials v1, v2, v3, v7, v8 are shown in FIG. 22. When the voltage applied to all the wires 160 in an individual cylinder has the same value, the cylinder 162 functions like a solid rod. When all the cylinders 162 are adjusted in this manner, and with appropriate polarity, the entire assembly operates like a standard quadrupole. That is, the voltages can be selected so that the field in the middle of the assembly is substantially a quadrupole field. By adjusting the voltage of each wire in the cylinder 162 different, higher multiple (other than quadrupole) fields can be provided.

Figure 33:
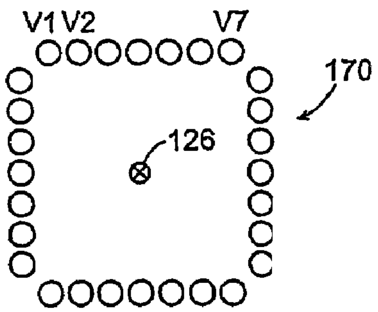
Figure 34:
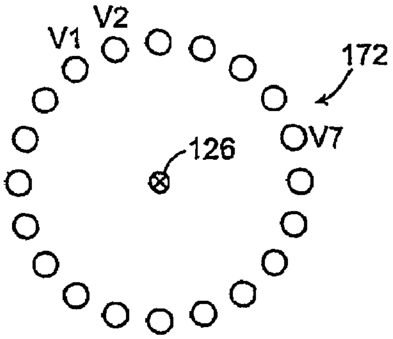

A further alternative includes replacing the quadrupole rods and linac electrodes with a linear array of wires 170 or 172, as shown in FIGS. 33 and 34. These embodiments may be operated in a manner similar to that described with reference to FIG. 22. Quadrupole and higher order fields can be achieved by selecting the appropriate voltage combination.

Similarly, yet another alternative for generating octopole and higher order fields is to increase the rod diameters of one pole set of a quadrupole rod set relative to other diameters of the other pole set. Alternatively still, opposite rods can be angled to inward or outward to create higher order fields. See P. H. Dawson, Advances in Electronics and Electron Physics (Vol. 53, 153–208, 1980), the contents of which are included herein by reference.

Figure 36A:
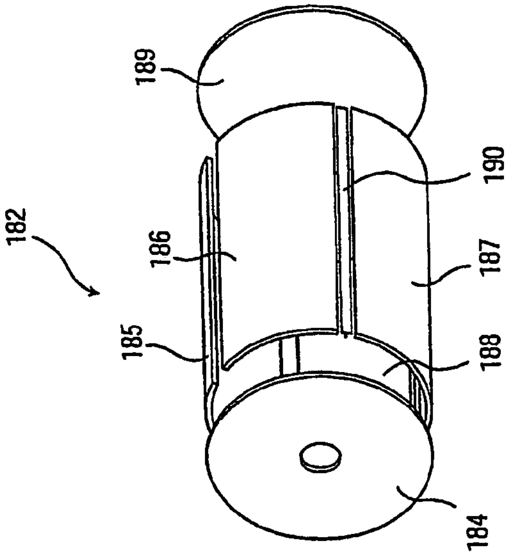
FIGS. 36A and 36B are perspective and cross-sectional views, respectively, of another example of a modified Penning trap.
Figure 36B:
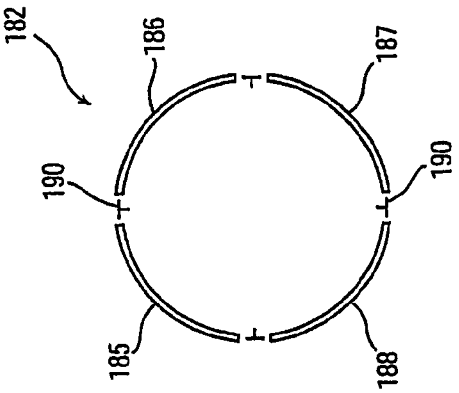
Figure 35A:
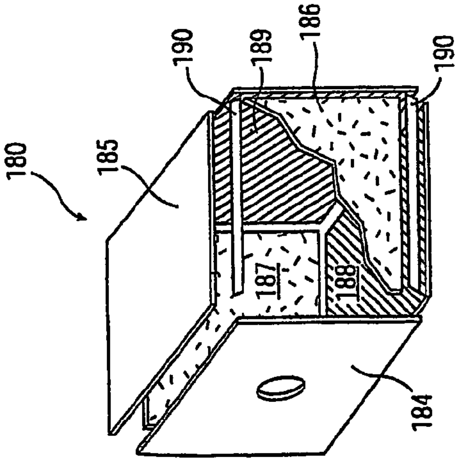
FIGS. 35A and 35B are perspective and cross-sectional views, respectively, of one example of a Penning trap modified to include additional electrodes.
Figure 35B:
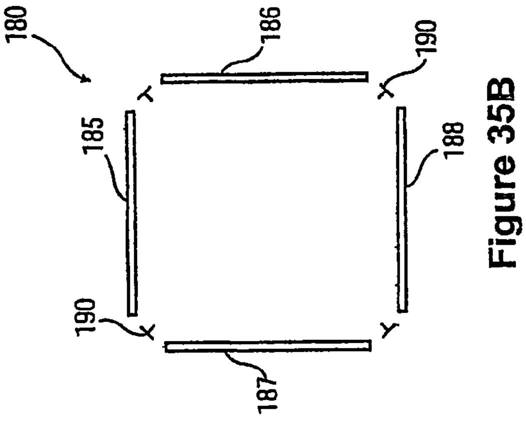

It should also be appreciated that the technique of introducing additional electrodes to dampen the oscillatory motion of resonantly excited ions at a periphery of a linear ion trap can be applied to other types of traps, such as the Penning trap. Examples of Penning traps 180, 182 modified to include additional electrodes 190 are shown in FIGS. 35A, 35B and 36A, 36B. The conventional Penning trap comprises at least six planar or curved surface electrodes 184–189 arranged in the form of a box (FIG. 35) or cylinder (FIG. 36). When used in ion cyclotron resonance mass spectrometry (ICR-MS) or Fourier transform ion cyclotron resonance mass spectrometry (FTMS) systems, the Penning trap, under high vacuum ($\leqq 10^{-9}$ mbar), is positioned in a magnetic field pointing along the longitudinal axis of the trap, i.e., the z direction. The magnetic field, in conjunction with suitable voltages applied to the planar electrodes 185–187, causes the ions to oscillate in a plane (x-y) perpendicular to the magnetic field lines. The ions oscillate cyclically with a frequency that is specific to the mass-to-charge ratio of the ions and the strength of the magnetic field. The planar electrodes 184, 189 perpendicular to the magnetic field lines provide a static electric field to trap the ions axially. Ions are fragmented by introducing a short pulse of collision gas into the Penning trap. A short burst of gas is used in order to minimize the time required to evacuate the trap back to near vacuum pressure prior to fragmentation, and to maintain oscillation during fragmentation. A number of techniques are known in the art for controlling fragmentation. These include: (a) sustained off-resonance irradiation (SORI), where ions of a selected m/z ratio are alternately excited and de-excited due to the difference between the excitation frequency and the ion cyclotron frequency; (b) very low energy CID (VLE), where ions are alternately excited and de-excited by a resonant excitation whose phase shifts 180 degrees; and multiple excitation for collisional activation (MECA), where ions are resonantly excited and then allowed to relax by collisions. In each of these techniques the fragmentation efficiency is relatively low, and increasing the excitation energy results in undesired ejection of ions from the trap. Indeed, each of these techniques attempts to reduce the kinetic energy imparted to the ions in order to prevent undesired ejection of the ions from the Penning trap. For example, the SORI technique employs an off-resonant excitation signal to limit the kinetic energy imparted to ions of selected m/z values. In the modified Penning traps 180, 182 each additional electrode 190 is kept at a potential midway between the potentials of the two adjacent planar electrodes. The collision gas is injected into the trap, and then a resonant excitation signal is applied. At the same time, appropriate voltages are applied to the additional electrodes 190, which will dampen the cyclical oscillatory motion of the resonantly excited ions as their orbits approach the radial periphery of the trap. This will allow the use of a higher amplitude excitation signal, increasing the total power input and increasing the fragmentation efficiency.

Finally, it should be understood that the background gas pressures, excitation amplitudes and excitation periods discussed herein with reference to the preferred embodiments are illustrative only and may be varied outside of the disclosed ranges without a noticeable decrease in performance as measured by the selectivity or resolution of fragmentation. None of the embodiments or operating ranges disclosed herein is intended to signify any absolute limits to the practice of the invention and the applicant intends to claim such operating parameters as broadly as permitted by the prior art. Those skilled in the art will appreciate that numerous other modifications and variations may be made to the embodiments disclosed herein without departing from the spirit of the invention.

We claim:

1. A mass spectrometer, comprising:

a linear ion trap having a quadrupolar rod set for generating a substantially quadrupole RF trapping field and a set of additional electrodes for superimposing a higher order multipole field to the trapping field;

means for providing a background gas in said trap at a pressure of less than approximately $9\times10^{-5}$Torr;

means for introducing ions into said trap;

means for applying a resonant excitation signal in order to promote collision-induced dissociation of selected ions; and means for mass analyzing the trapped ions to generate a mass spectrum.

2. A mass spectrometer according to claim 1, wherein a DC voltage potential is present between the rods of the quadrupole rod set and the additional electrodes.

3. A mass spectrometer according to claim 2, wherein said DC voltage potential is varied depending on the m/z value or values of selected resonantly excited ions.

4. A mass spectrometer according to claim 2, wherein each additional electrode is a T-shaped electrode having either a tapering or non-tapering stem section.

5. A mass spectrometer according to claim 1, wherein selected trapped ions are subjected to an alternating potential from said excitation signal that does not exceed approximately $1V_{(0\text{-}pk)}$, for a period exceeding 25 ms.

6. A mass spectrometer according to claim 5, wherein the selected trapped ions are subjected to an alternating potential having a maximum amplitude of 550 $mV_{(0\text{-}pk)}$, for a period of less than 550 mns.

7. A mass spectrometer according to claim 1, wherein four additional electrodes are interposed between the rods of the quadrupole rod set in order to approximate an octopole field.

8. A mass spectrometer, comprising:

a linear ion trap including means for generating a substantially quadrupole RF trapping field and means for superimposing a higher order multipole field to the trapping field;

means for providing a background gas in said trap at a pressure of less than approximately $9\times10^{-5}$Torr;

means for introducing ions into said trap;

means for applying a resonant excitation signal in order to promote collision-induced dissociation of selected ions; and means for mass analyzing the trapped ions to generate a mass spectrum.

9. A mass spectrometer according to claim 8, wherein selected ions trapped in said trap are subjected to an alternating potential from said excitation signal that does not exceed approximately $1V_{(0\text{-}pk)}$, for a period exceeding approximately 25 ms.

10. In a Penning trap having at least four planar or curved-surface electrodes for constraining ions radially and at least two electrodes for constraining ions axially, an improvement comprising at least one additional electrode interposed between any two adjacent radially-constraining electrodes, and a voltage generator for establishing a DC potential voltage between each additional electrode and the adjacent radial-constraining electrode.

* * * * *

UNITED STATES PATENT AND TRADEMARK OFFICE

CERTIFICATE OF CORRECTION

PATENT NO. : 7,227,137 B2
APPLICATION NO. : 10/508950
DATED : June 5, 2007
INVENTOR(S) : Londry et al.

It is certified that error appears in the above-identified patent and that said Letters Patent is hereby corrected as shown below:

On Title Page

Item 75 inventor William R. Stott is amended from “King (CA)” to -- King City (CA) --.

Signed and Sealed this

Eighteenth Day of December, 2007

JON W. DUDAS
*Director of the United States Patent and Trademark Office*